(12) United States Patent
Meng et al.

(10) Patent No.: US 12,406,379 B2
(45) Date of Patent: Sep. 2, 2025

(54) METHOD AND APPARATUS FOR DETECTING MOTION INFORMATION OF TARGET, DEVICE AND MEDIUM

(71) Applicant: Horizon Journey (Hangzhou) Artificial Intelligence Technology Co., Ltd., Zhejiang (CN)

(72) Inventors: Wenming Meng, Zhejiang (CN); Hongmei Zhu, Zhejiang (CN); Qian Zhang, Zhejiang (CN)

(73) Assignee: Horizon Journey (Hangzhou) Artificial Intelligence Technology Co., Ltd., Zhejiang (CN)

( * ) Notice: Subject to any disclaimer, the term of this patent is extended or adjusted under 35 U.S.C. 154(b) by 37 days.

(21) Appl. No.: 17/907,662

(22) PCT Filed: Feb. 18, 2022

(86) PCT No.: PCT/CN2022/076765
§ 371 (c)(1),
(2) Date: Sep. 28, 2022

(87) PCT Pub. No.: WO2022/213729
PCT Pub. Date: Oct. 13, 2022

(65) Prior Publication Data
US 2024/0212170 A1    Jun. 27, 2024

(30) Foreign Application Priority Data

Apr. 7, 2021   (CN) .................. 202110373003.X

(51) Int. Cl.
G06T 7/246    (2017.01)
G05D 1/243    (2024.01)
(Continued)

(52) U.S. Cl.
CPC .......... *G06T 7/246* (2017.01); *G05D 1/2435* (2024.01); *G05D 1/2437* (2024.01); *G06T 7/55* (2017.01);
(Continued)

(58) Field of Classification Search
CPC .. G06T 7/246; G06T 7/55; G06T 7/73; G06T 2207/10016; G06T 2207/30252;
(Continued)

(56) References Cited

U.S. PATENT DOCUMENTS

| 11,657,516 B2 * | 5/2023 | Mou ...................... G06V 20/40 |
| | | 382/103 |
| 2014/0270484 A1 | 9/2014 | Chandraker et al. |

(Continued)

FOREIGN PATENT DOCUMENTS

| CN | 108734726 A | 11/2018 |
| CN | 109727273 A | 5/2019 |

(Continued)

OTHER PUBLICATIONS

International Search Report and Written Opinion for International PCT Application No. PCT/CN2022/076765, dated Apr. 4, 2022.

(Continued)

*Primary Examiner* — Amara Abdi
(74) *Attorney, Agent, or Firm* — K&L Gates LLP

(57) ABSTRACT

Disclosed are a method for detecting motion information of a target, a device and memory. The method includes: performing target detection on a first image to obtain a detection box of a first target; acquiring depth information of first image in a corresponding first camera coordinate system and determining depth information of the detection box therefrom, and determining first coordinates of first target in first camera coordinate system based on a location of the detection box in an image coordinate system and the depth (Continued)

information thereof; transforming second coordinates of a second target in a second camera coordinate system corresponding to the second image into third coordinates in the first camera coordinate system based on pose change information of an image capturing device; and determining motion information of the first target based on the first and third coordinates. The disclosure avoids abundant computational processing and improves processing efficiency.

20 Claims, 7 Drawing Sheets

(51) Int. Cl.
    *G06T 7/55* (2017.01)
    *G06T 7/73* (2017.01)
(52) U.S. Cl.
    CPC ...... *G06T 7/73* (2017.01); *G06T 2207/10016* (2013.01); *G06T 2207/30252* (2013.01)
(58) Field of Classification Search
    CPC . G06T 2207/20084; G06T 2207/30244; G06T 2207/30261; G06T 7/254; G06T 7/20; G05D 1/2435; G05D 1/2437; G06V 10/24; G06V 10/82; G06V 20/56; G06V 20/52
    See application file for complete search history.

(56) References Cited

U.S. PATENT DOCUMENTS

| | | | |
|---|---|---|---|
| 2016/0034040 A1 | 2/2016 | Wada et al. | |
| 2019/0102886 A1* | 4/2019 | Guigues | G06T 7/194 |
| 2020/0160542 A1 | 5/2020 | Kanzawa et al. | |
| 2020/0175279 A1* | 6/2020 | Chen | G06V 20/10 |
| 2020/0226769 A1 | 7/2020 | Das et al. | |
| 2021/0043002 A1* | 2/2021 | Zeng | G06T 7/74 |
| 2021/0122367 A1 | 4/2021 | Yao et al. | |
| 2021/0150251 A1* | 5/2021 | Chen | G06T 7/20 |
| 2021/0208282 A1* | 7/2021 | Hamaguchi | G01S 17/42 |
| 2022/0055652 A1* | 2/2022 | Lee | G01S 17/89 |
| 2022/0237866 A1 | 7/2022 | Stein et al. | |
| 2022/0284666 A1* | 9/2022 | Chandler | G06T 19/20 |
| 2022/0306100 A1* | 9/2022 | Larsson | B60W 40/04 |

FOREIGN PATENT DOCUMENTS

| | | |
|---|---|---|
| CN | 109816690 A | 5/2019 |
| CN | 110415276 A | 11/2019 |
| CN | 110520694 A | 11/2019 |
| CN | 110533699 A | 12/2019 |
| CN | 110929567 A | 3/2020 |
| CN | 111213153 A | 5/2020 |
| CN | 111247557 A | 6/2020 |
| CN | 111402286 A | 7/2020 |
| CN | 111583329 A | 8/2020 |
| CN | 111723716 A | 9/2020 |
| CN | 112015170 A | 12/2020 |
| CN | 112419385 A | 2/2021 |
| CN | 112509047 A | 3/2021 |
| CN | 112541553 A | 3/2021 |
| CN | 112541938 A | 3/2021 |
| CN | 113096151 A | 7/2021 |
| JP | 2021025943 A | 2/2021 |
| WO | 2020014909 A1 | 1/2020 |
| WO | 2020188120 A1 | 9/2020 |
| WO | 2020240284 A2 | 12/2020 |
| WO | 2021013790 A1 | 1/2021 |

OTHER PUBLICATIONS

Extended European Search Report from the corresponding European Patent Application No. 22783799.4, mailed on Sep. 20, 2024.
Dynamic target capture and real-time tracking algorithm in amphibious environment, North University of China (Jun. 6, 2020), p. 1-84.

* cited by examiner

METHOD AND APPARATUS FOR DETECTING MOTION INFORMATION OF TARGET, DEVICE AND MEDIUM

CROSS-REFERENCE TO RELATED APPLICATIONS

This application is a U.S. National Stage Entry under 35 U.S.C. § 371 of International Patent Application No. PCT/CN2022/076765, entitled METHOD AND APPARATUS FOR DETECTING MOTION INFORMATION OF TARGET, DEVICE AND MEDIUM, filed Feb. 18, 2022, which claims priority to and the benefit of Chinese Application No. 202110373003.X, filed with the Chinese Patent Office on Apr. 7, 2021 and entitled METHOD AND APPARATUS FOR DETECTING MOTION INFORMATION OF TARGET, DEVICE AND MEDIUM, the entire disclosures of which are incorporated by reference in their entirety herein.

TECHNICAL FIELD

The present disclosure relates to the computer vision technology, and in particular, to a method and apparatus for detecting motion information of a target, a method and apparatus for controlling a traveling object based on motion information of a target, an electronic device and a storage medium.

BACKGROUND

The estimation of the moving velocity and direction of an object has been the focus of research in the fields of unmanned driving, security and protection monitoring, scene understanding, etc. In the fields of unmanned driving, security and protection monitoring, scene understanding, etc., the moving velocities and directions of all objects in a scene need to be estimated and provided to a decision-making layer so that the decision-making layer makes corresponding decisions. For example, in an unmanned driving system, when sensing that a moving object (such as a human or an animal) beside a road gets close to the middle of the road, the decision-making layer may control the vehicle to decelerate and even stop, thereby guaranteeing safe vehicle traveling.

At present, in scenarios such as unmanned driving, security and protection monitoring, and scene understanding, data may be collected mostly by Light Detection and Ranging (LiDAR). Specifically, a high-frequency laser beam is emitted, and then a distance to a target point is calculated based on the emission time and the reception time of the laser beam, thereby obtaining point cloud data. Subsequently, target detection and target tracking are performed on point cloud data collected at two times corresponding to a certain time range, and the moving velocity and direction of the target within the time range are then calculated.

SUMMARY

The present disclosure is proposed to solve the above-mentioned problems. Embodiments of the present disclosure provide a method and apparatus for detecting motion information of a target, a method and apparatus for controlling a traveling object based on motion information of a target, an electronic device and a storage medium.

According to one aspect of the embodiments of the present disclosure, there is provided a method for detecting motion information of a target, including:

performing target detection on a first image to obtain a detection box of a first target, wherein the first image is an image of a scene outside a traveling object that is captured by an image capturing device on the traveling object in a traveling process of the traveling object;

acquiring depth information of the first image in a corresponding first camera coordinate system;

determining depth information of the detection box of the first target based on the depth information of the first image, and determining first coordinates of the first target in the first camera coordinate system based on a location of the detection box of the first target in an image coordinate system and the depth information of the detection box of the first target;

acquiring pose change information of the image capturing device from capturing of a second image to capturing of the first image, wherein the second image is an image that is before the first image in terms of timing and spaced apart from the first image by a preset number of frames in an image sequence where the first image is present;

transforming second coordinates of a second target in a second camera coordinate system corresponding to the second image into third coordinates in the first camera coordinate system based on the pose change information, wherein the second target is a target in the second image that corresponds to the first target: and determining motion information of the first target within a corresponding time range from a capturing time point of the second image to that of the first image based on the first coordinates and the third coordinates.

According to another aspect of the embodiments of the present disclosure, there is provided a method for controlling intelligent driving, including:

capturing, by an image capturing device on a traveling object, an image sequence of a scene outside the traveling object in a traveling process of the traveling object;

using at least one image in the image sequence as a first image and at least one image in the image sequence that is before the first image and spaced apart from the first image by a preset number of frames as a second image, and determining motion information of a target in the scene by using the method for detecting motion information of a target provided in any embodiment of the present disclosure; and generating a control instruction for controlling a traveling state of the traveling object based on the motion information of the target.

According to still another aspect of the embodiments of the present disclosure, there is provided an apparatus for detecting motion information of a target, including:

a detection module configured to perform target detection on a first image to obtain a detection box of a first target, wherein the first image is an image of a scene outside a traveling object that is captured by an image capturing device on the traveling object in a traveling process of the traveling object;

a first acquisition module configured to acquire depth information of the first image in a corresponding first camera coordinate system;

a first determination module configured to determine depth information of the detection box of the first target based on the depth information of the first image acquired by the first acquisition module;

a second determination module configured to determine first coordinates of the first target in the first camera coordinate system based on a location of the detection box of the first target obtained by the detection module in an image coordinate system and the depth information of the detection box of the first target determined by the first determination module;

a second acquisition module configured to acquire pose change information of the image capturing device from capturing of a second image to capturing of the first image, wherein the second image is an image that is before the first image in terms of timing and spaced apart from the first image by a preset number of frames in an image sequence where the first image is present;

a transformation module configured to transform second coordinates of a second target in a second camera coordinate system corresponding to the second image into third coordinates in the first camera coordinate system based on the pose change information acquired by the second acquisition module, wherein the second target is a target in the second image that corresponds to the first target; and a third determination module configured to determine motion information of the first target within a corresponding time range from a capturing time point of the second image to that of the first image based on the first coordinates determined by the second determination module and the third coordinates transformed by the transformation module.

According to yet another aspect of the embodiments of the present disclosure, there is provided an apparatus for controlling intelligent driving, including:

an image capturing device disposed on a traveling object and configured to capture an image sequence of a scene outside the traveling object in a traveling process of the traveling object;

a motion information detecting device configured to use at least one image in the image sequence as a first image and at least one image in the image sequence that is before the first image and spaced apart from the first image by a preset number of frames as a second image, and determine motion information of a target in the scene, the motion information detecting device including the apparatus for detecting motion information of a target provided in any embodiment of the present disclosure; and a control device configured to generate a control instruction for controlling a traveling state of the traveling object based on the motion information of the target detected by the motion information detection device.

According to still another aspect of the embodiments of the present disclosure, there is provided a computer readable storage medium that stores thereon a computer program configured to perform the method for detecting motion information of a target or the method for controlling a traveling object based on motion information of a target provided in any embodiment of the present disclosure.

According to yet another aspect of the embodiments of the present disclosure, there is provided an electronic device, including:

a processor; and a memory configured to store instructions executable by the processor, wherein the processor is configured to read the executable instructions from the memory and execute the instructions to implement the method for detecting motion information of a target or the method for controlling a traveling object based on motion information of a target provided in any embodiment of the present disclosure.

Based on the method and apparatus for detecting motion information of a target, the electronic device and the storage medium provided in the above embodiments of the present disclosure, images of the scene outside the traveling object are captured by the image capturing device on the traveling object in the traveling process of the traveling object, and are performed the target detection to obtain the detection box of the first target, and to acquire the depth information of the first image in the corresponding first camera coordinate system, then the depth information of the detection box of the first target is determined based on the depth information of the first image, and then the first coordinates of the first target in the first camera coordinate system are determined based on the location of the detection box of the first target in the image coordinate system and the depth information of the detection box of the first target; the pose change information of the image capturing device from the capturing of the second image to the capturing of the first image is acquired, wherein the second image is an image that is before the first image in terms of timing and spaced apart from the first image by a preset number of frames in the image sequence where the first image is present, subsequently, based on the pose change information and using a target in the second image corresponding to the first target as a second target, the second coordinates of the second target in the second camera coordinate system corresponding to the second image are transformed into the third coordinates in the first camera coordinate system, and then the motion information of the first target within the corresponding time range from the capturing time point of the second image to that of the first image is determined based on the first coordinates and the third coordinates. According to the embodiments of the present disclosure, the motion information of targets in driving scenes can be obtained by utilizing the computer vision technology without the help of LiDAR. Compared with the approach of acquiring the moving velocity and direction of a target by LiDAR, since there is no need to emit a high-frequency laser beam to establish point cloud data, perform target detection and target tracking on two pieces of point cloud data and calculate the moving velocity and direction of the target, a large amount of computational processing can be avoided and the processing time can be saved with improved processing efficiency, helping meet the high real-time requirements of unmanned driving and other scenarios.

Based on the method and apparatus for controlling a traveling object based on motion information of a target, the electronic device and the storage medium provided in the above embodiments of the present disclosure, an image sequence of the scene outside the traveling object is captured by the image capturing device on the traveling object in the traveling process of the traveling object: and by using at least one image in the image sequence as a first image, and using at least one image in the image sequence that is before the first image and spaced apart from the first image by a preset number of frames as a second image, the motion information of the target in the driving scene is determined through the method for detecting motion information of a target provided in any embodiment of the present disclosure, and then the control instruction for controlling the traveling state of the traveling object is generated based on the motion information of the target. Thus, the detection of the motion information of the target in the driving scene by using the computer vision technology and the intelligent driving control on the traveling object are realized, which help to satisfy real-time intelligent driving control on the traveling object in the scenario of unmanned driving to guarantee safe traveling of the traveling object.

The technical solutions of the present disclosure will be further described in detail below with reference to accompanying drawings and embodiments.

BRIEF DESCRIPTION OF DRAWINGS

The above and other objectives, features and advantages of the present disclosure will become more apparent by describing the embodiments of the present disclosure in more details with reference to the accompanying drawings. The accompanying drawings are provided for further understanding of the embodiments of the present disclosure, constitute a part of the description, and are intended to explain the present disclosure with the embodiments of the present disclosure, but do not constitute limitations to the present disclosure. Like reference numerals denote like components or steps throughout the drawings.

DETAILED DESCRIPTION OF THE EMBODIMENTS

Figure 1:
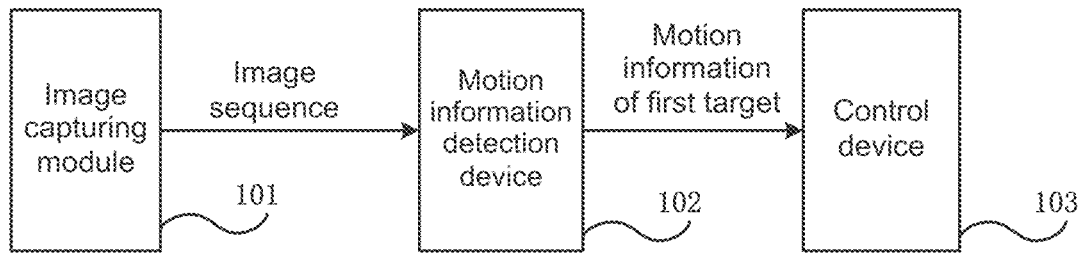
FIG. 1 is a diagram illustrating a scenario to which the present disclosure is applicable.

Exemplary embodiments of the present disclosure will be described below in detail with reference to the accompanying drawings. Apparently, the described embodiments are merely a part rather than all of the embodiments of the present disclosure. It should be understood that the present disclosure is not limited to the exemplary embodiments described herein.

It should be noted that the relative arrangement of components and steps, numerical expressions and numerical values set forth in these embodiments do not limit the scope of the present disclosure unless otherwise specified.

It will be appreciated by a person skilled in the art that terms such as "first" and "second" used in the embodiments of the present disclosure are merely meant to distinguish between different steps, devices, modules or the like, and neither represent any particular technical meaning nor indicate a necessary logical sequence of them.

It will be also appreciated that in the embodiments of the present disclosure, the term "a plurality of" may refer to two or more, and the term "at least one" may refer to one, two or more.

It will be further appreciated that when not expressly defined or conversely taught in the context, any one component, data or structure mentioned in an embodiment of the present disclosure may be generally construed as one or more such items.

In addition, the term "and/or" used in the present disclosure merely describes an association relationship between associated objects, and indicates that three types of relationships may exist. For example, A and/or B may indicate that A exists alone, both A and B exist, or B exists alone. In addition, the character "/" in the present disclosure generally indicates that the associated objects are in an "or" relationship.

It will be further appreciated that for brevity, the differences between embodiments are emphasized in the descriptions of the embodiments of the present disclosure, and reference can be made to one another for identical or similar parts, which will not be redundantly described one by one.

Meanwhile, it should be understood that for ease of description, each portion in the accompanying drawings is not necessarily drawn to the actual scale.

The following description of at least one exemplary embodiment is merely illustrative rather than limiting of the present disclosure or application or use thereof in any way.

Techniques, methods and devices known to those of ordinary skill in the related art may not be discussed in detail, but where appropriate, the techniques, methods and devices should be considered as part of the description.

It should be noted that similar reference numerals and letters represent similar items in the accompanying drawings below. Therefore, once an item is defined in one figure, it does not need to be further defined and described in subsequent figures.

The embodiments of the present disclosure may be applied to electronic devices such as terminal devices, computer systems, and servers, and may be operated together with numerous other general-purpose or dedicated computing system environments or configurations. Examples of well-known terminal devices, computer systems, environments and/or configurations suitable for use together with the electronic devices such as terminal devices, computer systems, and servers include but are not limited to a personal computer system, a server computer system, a thin client, a thick client, a hand-held or laptop device, a microprocessor based system, a set-top box, a programmable consumer electronic product, a network personal computer, a small computer system, a large computer system, a distributed cloud computing technical environment including any system mentioned above, etc.

The electronic devices such as terminal devices, computer systems, and servers may be described in the general context of computer system executable instructions (such as program modules) executed by computer systems. Typically, program modules may include routines, programs, object programs, components, logics, data structures, etc., which perform specific tasks or implement specific abstract data types. Computer systems/servers may be implemented in a distributed cloud computing environment in which tasks are performed by remote processing devices linked via a communication network. In the distributed cloud computing environment, program modules may reside on a local or remote computing system storage medium including a storage device.

INTRODUCTION

In the process of implementing the present disclosure, the inventors of present disclosure have found through research that by using LiDAR, the depth values of a number of points in an instantaneous scene can be obtained, but the information such as moving velocity and direction of an object cannot be obtained directly. In order to obtain the moving velocity and direction of the object within a certain time range, target detection and target tracking need to be performed on point cloud data collected at two time points corresponding to the time range, and the moving velocity and direction of the target within the time range are then calculated. In this manner, a large amount of computational processing needs to be carried out, which may take a long time with low efficiency. As a result, the high real-time requirements of unmanned driving and other scenarios cannot be met.

An embodiment of the present disclosure provide a technical solution of acquiring motion information of a target in a driving scene based on a driving scene image sequence by using the computer vision technology. The technical solution specifically includes capturing, by an image capturing device on a traveling object, images of a scene outside the traveling object in the traveling process of the traveling object; performing target detection and target tracking on a first image and a second image at an interval of a preset number of frames in the captured image sequence; acquiring first coordinates of a target in a first camera coordinate system corresponding to the first image and second coordinates of the same target in a second camera coordinate system corresponding to the second image; transforming the second coordinates of the same target in the second camera coordinate system corresponding to the second image to the first camera coordinate system to obtain third coordinates, and then determining the motion information of the target within a time range corresponding to capturing time points of the first image and the second image based on the first coordinates and the third coordinates. The embodiment of the present disclosure does not require the use of LiDAR, and thus can avoid a large amount of computational processing, save the processing time, and improve the processing efficiency, helping meet the high real-time requirements of unmanned driving and other scenarios.

After the motion information of the target in the driving scene is detected based on the technical solution provided in the above embodiment of the present disclosure, a control instruction for controlling a traveling state of a traveling object may be generated based on the motion information of the target. Thus, the detection of the motion information of a target in a driving scene by using the computer vision technology and the intelligent driving control on a traveling object are realized, helping meet real-time intelligent driving control on a traveling object in the scenario of unmanned driving to guarantee safe traveling of the traveling object.

Example System

Embodiments of the present disclosure may be applied to intelligent driving control scenarios of traveling objects such as vehicles, robots and toy vehicles and allow for control on a traveling state of a traveling object by detecting the motion information of a target in a driving scene of the traveling object and generating a control instruction for controlling the traveling state of the traveling object.

FIG. 1 is a diagram illustrating a scenario to which the present disclosure is applicable. As shown in FIG. 1, when this embodiment of the present disclosure is applied to an intelligent driving control scenario of a traveling object, an image capturing module 101 (e.g., an image capturing device such as a camera) on the traveling object operates to capture an image sequence which is then input to a motion information detection device 102 of the embodiment of the present disclosure. The motion information detection device 102 operates to: use each image or an image selected at an interval of several frames in the image sequence as a second image, and an image in the image sequence that is behind the second image in terms of timing and spaced apart from the second image by a certain number of frames as a first image, and perform target detection on the first image to obtain a detection box of a first target; acquire depth information of the first image in a corresponding first camera coordinate system, and determine depth information of the detection box of the first target based on the depth information of the first image; determine first coordinates of the first target in the first camera coordinate system based on a location of the detection box of the first target in an image coordinate system and the depth information of the detection box of the first target; transform second coordinates of a second target in a second camera coordinate system corresponding to the second image into third coordinates in the first camera coordinate system based on pose change information of the image capturing device from the capturing of the second image to the capturing of the first image; and then determine motion information of the first target within a corresponding time range from the capturing time point of the second image to that of the first image based on the first coordinates and the third coordinates, and output the motion information. A control device 103 operates to control a traveling state of the traveling object such as a vehicle, a robot or a toy vehicle based on the motion information of the first target within the corresponding time range output from the motion information detection device 102. For example, in an application scenario of controlling the traveling state of a traveling object, if it is determined depending on the motion information of a first target (the moving information may include a moving velocity and direction) and the traveling state of the traveling object (the traveling state may include a traveling velocity and traveling direction) that the traveling object may collide with the first target in 5 seconds, the control device 103 generates a control instruction for controlling the traveling object to decelerate and outputs the control instruction to the traveling object to control the current traveling object to decelerate and avoid the traveling object from colliding with the first target. The embodiments of the present disclosure have no particular limitation on specific application scenarios.

Example Method

Figure 2:
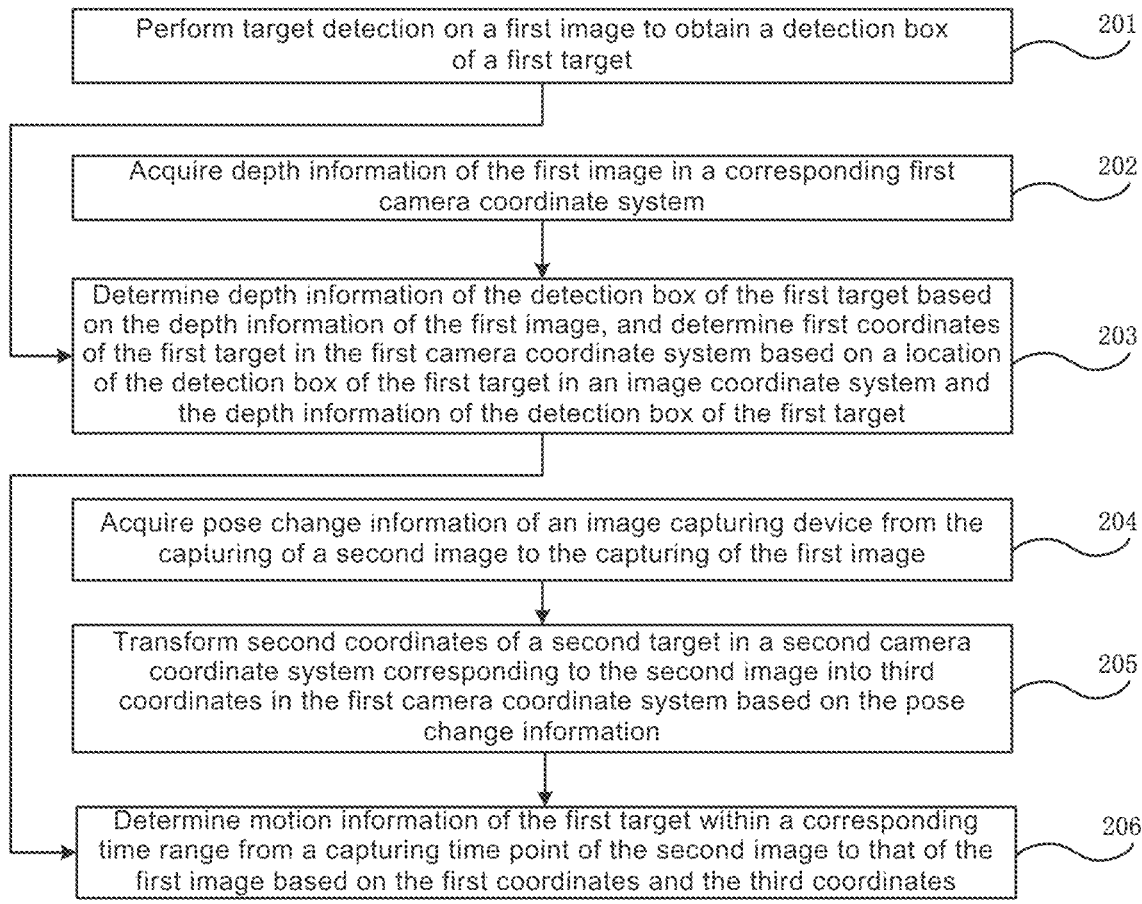
FIG. 2 is a schematic flowchart of a method for detecting motion information of a target provided in an exemplary embodiment of the present disclosure.

FIG. 2 is a schematic flowchart of a method for detecting motion information of a target provided in an exemplary embodiment of the present disclosure. This embodiment may be applied to an electronic device or to a traveling object such as a vehicle, a robot, and a toy vehicle. As shown in FIG. 2, the method for detecting motion information of a target provided in this embodiment includes the following steps.

At step 201, target detection is performed on a first image to obtain a detection box of a first target.

The first image is an image of a scene outside a traveling object captured by an image capturing device on the traveling object in the traveling process of the traveling object. The first image may be an RGB (red, green, and blue) image or a grayscale image. The embodiments of the present disclosure have no particular limitation on the first image.

Alternatively, the target in the embodiments of the present disclosure may be any target of interest in the scene outside the traveling object, such as a moving or stationary human, small animal, and an object, where the object may be, for example, a vehicle, a building on either side of a road, a green plant, a road marking, a traffic light or the like. The embodiments of the present disclosure have no particular limitation on targets to be detected, which may be determined as required in practice.

Alternatively, in some embodiments, a preset target detection framework, for example, a region based algorithm such as a Recurrent Neural Network (RCNN), a Fast RCNN and a Mask RCNN, a regression based algorithm such as You Only Look Once (YOLO), or a Single Shot MultiBox Detector (SSD) algorithm obtained by combining Faster RCNN with YOLO, may be adopted to perform target detection on the first image. The embodiments of the present disclosure have no particular limitation on specific approaches for detecting targets and target detection framework adopted.

In embodiments of the present disclosure, the first target is a target in the first image, which may be one target or a plurality of targets. Further, said plurality of targets may be targets of the same type (e.g., all humans) or targets of different types (e.g., including humans, vehicles, etc.). Correspondingly, one or more detection boxes of the first target may be obtained by performing target detection on the first image. The embodiments of the present disclosure have no particular limitation on the number and types of the first target.

The detection box in the embodiments of the present disclosure is a bounding box of the target. Alternatively, each detection box may be expressed by using a four-dimensional vector (x, y, w, h), where (x, y) represents coordinates of the detection box in an image coordinate system, which may be the coordinates of the central point or any preset vertex of the detection box in the image coordinate system; and w and h represent a width and a height of the detection box, respectively.

At step 202, depth information of the first image in a corresponding first camera coordinate system is acquired.

In embodiments of the present disclosure, the depth information is used for distance information between points (corresponding to pixels in the image, respectively) in the scene and the image capturing device. In some embodiments, the depth information may be specifically expressed as a depth map. The depth map is an image or an image channel including the distance information between points in the scene and the image capturing device. The depth map is similar to a grayscale image, and each pixel value thereof is equivalent to an actual distance (L) between the image capturing device and a single point in the scene. Each pixel value occupies a short length to store a distance of the image capturing device to a corresponding point.

Alternatively, in some embodiments, the depth information of the first image in the corresponding first camera coordinate system may be acquired through a neural network. The neural network is a pre-trained neural network which is capable of performing depth prediction based on an input image and outputting the depth information of the scene in the image. For example, an end-to-end U-shaped deep neural network and a monocular depth prediction method based on deep learning may be adopted to perform depth prediction on the input first image to obtain the depth information of the first image in the corresponding first camera coordinate system.

In embodiments of the present disclosure, the camera coordinate system is a three-dimensional (3D) coordinate system established with the focus center of the image capturing device as the origin and an optical axis (i.e., the depth direction) as the Z-axis. In the traveling process of the traveling object, the image capturing device on the traveling object is in a state of motion, and therefore, the pose of the image capturing device is also in a state of change and the correspondingly established 3D coordinate system is also different. The first camera coordinate system corresponding to the first image is the 3D coordinate system used when the image capturing device captures the first image.

Alternatively, step 202 and step 201 may be performed simultaneously or in any temporal order, which will not be particularly limited in the embodiments of the present disclosure.

At step 203, depth information of the detection box of the first target is determined based on the depth information of the first image, and first coordinates of the first target in the first camera coordinate system are determined based on a location of the detection box of the first target in the image coordinate system and the depth information of the detection box of the first target.

In step 203, the depth information of the first image refers to the depth information of the first image in the corresponding first camera coordinate system determined through step 202, and the depth information of the detection box of the first target refers to the depth information of the detection box of the first target in the first camera coordinate system.

At step 204, pose change information of the image capturing device from the capturing of a second image to the capturing of the first image is acquired.

The second image is an image that is before the first image in terms of timing and spaced apart from the first image by a preset number of frames in an image sequence where the first image is present.

In embodiment of the present disclosure, the specific value of the preset number of frames may be set according to actual requirements (e.g., the specific scenario, the state of motion of the traveling object, and the image capturing frequency of the image capturing device), which may be 0, 1, 2, 3, or the like. When the preset number of frames is 0, the second image and the first image are two adjacent images. For example, in a scenario of driving at a high velocity, in case of a high moving velocity of the traveling object and/or a high image capturing frequency of the image capturing device, the preset number of frames may be relatively small to avoid that a target in the second image has moved out of the coverage of the image capturing device when the image capturing device captures the first image and thus cannot be present in the first image. Accordingly, effective detection on the motion information of a target in the scene outside the traveling object can be realized. However, in a scenario of driving on a crowded urban road, in case of a low moving velocity of the traveling object and/or a low image capturing frequency of the image capturing device, the preset number of frames may be relatively large so that the motion information of the same target within the corresponding time range from the capturing time point of the second image to that of the first image can be detected and the occupancy of computing resources and storage resources required by frequently performing the method for detecting motion information can also be avoided. As a result, the utilization of resources is improved.

Alternatively, the pose change information in the embodiments of the present disclosure refers to a difference between a pose of the image capturing device when capturing the first image and a pose of the image capturing device when capturing the second image. The pose change information is based on 3D space, and may be specifically expressed as a matrix and hence called a pose change matrix. The pose change information may include translation information and rotation information of the image capturing device. The translation information of the image capturing device may include respective displacements of the image capturing device on three coordinate axes XYZ in a 3D coordinate system. The rotation information of the image capturing device may be a rotation vector based on Roll, Yaw and Pitch, which includes rotation vector components in three rotation directions Roll, Yaw and Pitch, where Roll, Yaw and Pitch represent respective rotations of the image capturing device around three coordinate axes XYZ in a 3D coordinate system.

Alternatively, in some embodiments, the pose change information of the image capturing device from the capturing of the second image to the capturing of the first image may be acquired by using the vision technology. For example, the approach of Simultaneous Localization And Mapping (SLAM) may be adopted to acquire the pose change information. For example, the first image (an RGB image), the depth information of the first image, and the second image (an RGB image) may be input to a Red Green Blue Depth (RGBD) model based on an Open Source Oriented FAST and Rotated BRIEF (ORB)-SLAM framework, and the pose change information may be then output by the RGBD model. In addition, other manners such as a Global Positioning System (GPS) and an angular velocity sensor, may also be adopted in the embodiments of the present disclosure to acquire the pose change information of the image capturing device from the capturing of the second image to the capturing of the first image. The embodiment of the present disclosure has no particular limitation on the specific manner of acquiring the pose change information of the image capturing device from the capturing of the second image to the capturing of the first image.

At step 205, second coordinates of a second target in a second camera coordinate system corresponding to the second image are transformed to third coordinates in the first camera coordinate system based on the pose change information of the image capturing device from the capturing of the second image to the capturing of the first image.

The second target is a target in the second image corresponding to the first target. Corresponding to the first target, the second target may be one target or a plurality of targets. Further, said plurality of targets may be targets of the same type (e.g., all humans) or targets of different types (e.g., including humans, vehicles, etc.).

In embodiments of the present disclosure, the second camera coordinate system corresponding to the second image is the 3D coordinate system used when the image capturing device captures the second image.

Alternatively, steps 204-205 and steps 201-203 may be performed simultaneously or in any temporal order, which will not be limited in the embodiments of the present disclosure.

At step 206, the motion information of the first target within the corresponding time range from the capturing time point of the second image to that of the first image is determined based on the first coordinate and the third coordinate.

In embodiments of the present disclosure, the motion information of the first target may include a moving velocity and a moving direction of the first target within the corresponding time range.

In this embodiment, the image capturing device on the traveling object captures images of the scene outside the traveling object in the traveling process of the traveling object. The target detection is then performed on the captured first image to obtain the detection box of the first target. The depth information of the first image in the corresponding first camera coordinate system is acquired, and the depth information of the detection box of the first target is determined based on the depth information of the first image. Then, the first coordinates of the first target in the first camera coordinate system are determined based on the location of the detection box of the first target in the image coordinate system and the depth information of the detection box of the first target. The pose change information of the image capturing device from the capturing of the second image to the capturing of the first image is acquired, where the second image is an image that is before the first image in terms of timing and spaced apart from the first image by a preset number of frames in the image sequence where the first image is present. Subsequently, based on the pose change information and using a target in the second image corresponding to the first target as a second target, the second coordinates of the second target in the second camera coordinate system corresponding to the second image are transformed into the third coordinates in the first camera coordinate system, and then the motion information of the first target within the corresponding time range from the capturing time point of the second image to that of the first image is determined based on the first coordinates and the third coordinates. According to the embodiments of the present disclosure, the motion information of targets in driving scenes may be obtained by utilizing the computer vision technology without the help of LiDAR. Compared with the approach of acquiring the moving velocity and direction of a target by LiDAR, since there is no need to emit a high-frequency laser beam to establish point cloud data, to perform target detection and target tracking on two pieces of point cloud data and to calculate the moving velocity and direction of the target, a large amount of computational processing can be avoided and the processing time can be saved with improved processing efficiency, helping meet the high real-time requirements of unmanned driving and other scenarios.

Figure 3:
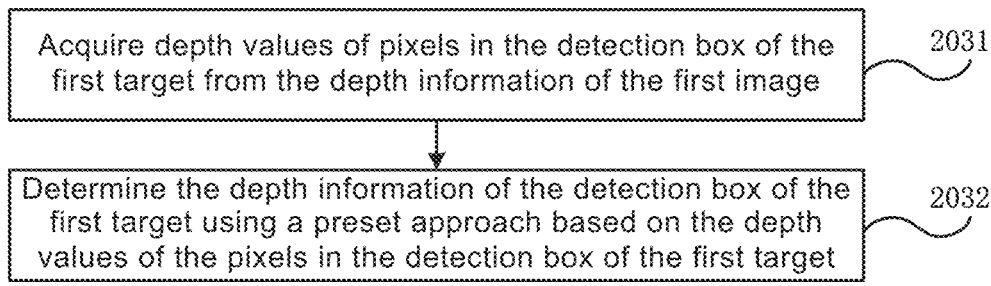
FIG. 3 is a schematic flowchart of a method for detecting motion information of a target provided in another exemplary embodiment of the present disclosure.

FIG. 3 is a schematic flowchart of a method for detecting motion information of a target provided in another exemplary embodiment of the present disclosure. As shown in FIG. 3, on the basis of the embodiment shown in FIG. 2, step 203 may include the following steps.

At step 2031, depth values of pixels in the detection box of the first target are acquired from the depth information of the first image.

The depth information of the first image includes depth values of pixels in the first image. Thus, the depth values of the pixels in the detection box of the first target may be inquired from the depth information of the first image.

At step 2032, the depth information of the detection box of the first target is determined by using a preset approach based on the depth values of the pixels in the detection box of the first target.

A plurality of pixels are included in the detection box of the first target, and each pixel has its own depth value. On the basis of this embodiment, the depth information of the detection box of the first target is determined synthetically based on the depth values of the pixels in the detection box of the first target so that the first coordinates of the first target in the first camera coordinate system can be accurately determined based on the depth information and the location of the detection box of the first target in the image coordinate system. Accordingly, the accuracy of the coordinates of the first target in the first camera coordinate system may be improved.

For example, in some embodiments, a depth value occurring most frequently among the depth values of the pixels in the detection box of the first target may be selected as the depth information of the detection box of the first target.

In the process of implementing the invention of the present disclosure, the inventors have found through research that in practical application, the quality of images captured by the image capturing device may be affected by vibration, light and the like in the traveling process of a vehicle, resulting in some noise points in the images. The depth values of such noise points cannot be acquired accurately, leading to excessively large or small depth values of these noise points in the depth information. However, in a scene, distances between different points of a same target and an image capturing device may be similar, and therefore, the depth values of corresponding pixels may also be similar. In this embodiment, the depth value occurring most frequently (i.e., the depth value corresponding to the most pixels) among the depth values of the pixels in the detection box of the first target is selected. The depth values of several pixels having relatively great differences may be neglected to avoid the influence of the depth values of noise pixels in the first image on the depth information of the entire detection box of the first target, thus improving the accuracy of the depth information of the detection box of the first target.

Alternatively, in some other embodiments, among the pixels in the detection box of the first target, the number of pixels having their depth values falling within a same preset depth value range may be determined separately, and then the depth information of the detection box of the first target may be determined based on the depth value range corresponding to the largest number of pixels having their depth values falling within the same depth value range. For example, the maximum value, the minimum value, the average value of the maximum value and the minimum value, or a mid-value of the depth value range corresponding to the largest number of pixels having their depth values falling within the same depth value range is used as the depth value of the detection box of the first target.

In this embodiment, depth value ranges may be demarcated in advance. Then, among the pixels in the detection box of the first target, the number of pixels having their depth values falling within the same preset depth value range is counted separately. The more the pixels falling within a depth value range, the more the corresponding points on the surface of the first target. Subsequently, the depth information of the detection box of the first target may be determined based on the depth value range corresponding to the largest number of pixels having their depth values falling within the same depth value range. The depth values of several pixels having great differences may be neglected to avoid the influence of the depth values of noise pixels in the first image on the depth information of the entire detection box of the first target, thus improving the accuracy of the depth information of the detection box of the first target.

Alternatively, in still some other embodiments, an average value of the depth values of the pixels in the detection box of the first target may also be acquired as the depth information of the detection box of the first target.

In this embodiment, the depth information of the detection box of the first target may be determined rapidly, by acquiring the average value of the depth values of the pixels in the detection box of the first target as the depth information of the detection box of the first target, and the influence of the depth values of several pixels having great differences on the depth information of the entire detection box of the first target is reduced, thus improving the accuracy of the depth information of the detection box of the first target.

Figure 4:
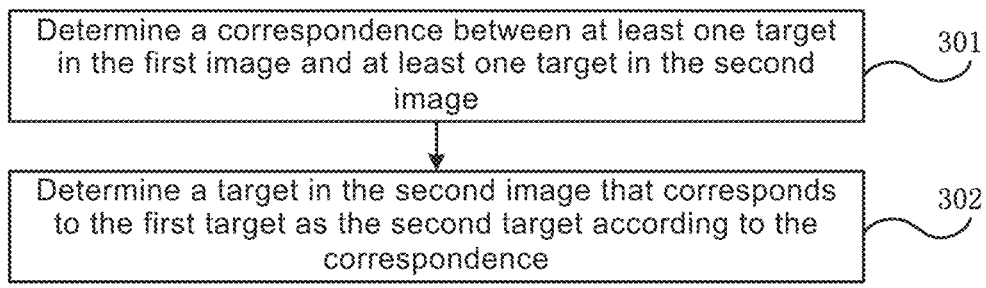
FIG. 4 is a schematic flowchart of a method for detecting motion information of a target provided in still another exemplary embodiment of the present disclosure.

FIG. 4 is a schematic flowchart of a method for detecting motion information of a target provided in still another exemplary embodiment of the present disclosure. As shown in FIG. 4, on the basis of the embodiment shown in FIG. 2 or FIG. 3, the method may further include the following steps before step 205.

At step 301, a correspondence between at least one target in the first image and at least one target in the second image is determined.

The at least one target in the first image includes the first target described above.

In embodiments of the present disclosure, the at least one target in the first image and the at least one target in the second image may be any target of interest in the scene outside the traveling object, for example, various types of targets such as humans, vehicles, and buildings. The first target is one or more targets among the at least one target in the first image, and the second target is one or more targets among the at least one target in the second image.

Determining the correspondence between at least one target in the first image and at least one target in the second image specifically includes determining which targets among the targets in the first image and the second image are the same targets and establishing the correspondence between two targets that are present in the first image and the second image and are the same target. For example, the first target is a target in need of detection of motion information in the first image, and the second target is a target in the second image that is the same one as the first target.

At step 302, a target in the second image that corresponds to the first target is determined as the second target according to the correspondence.

After the correspondence between at least one target in the first image and at least one target in the second image is determined at step 301, a target in the second image that corresponds to the first target in the first image may be determined as the second target based on the correspondence.

Based on this embodiment, with respect to two images, a correspondence between targets in these two images may be determined. Thus, the second target in the second image that corresponds to the first target may be directly determined according to the correspondence, thereby improving the efficiency of determining the second target.

Alternatively, in some embodiments, in step 301, the detection box of at least one target in the second image may be tracked to obtain the correspondence between at least one target in the first image and at least one target in the second image.

Based on this embodiment, a correspondence between targets in different images may be obtained by tracking the detection box of a target.

Figure 5:
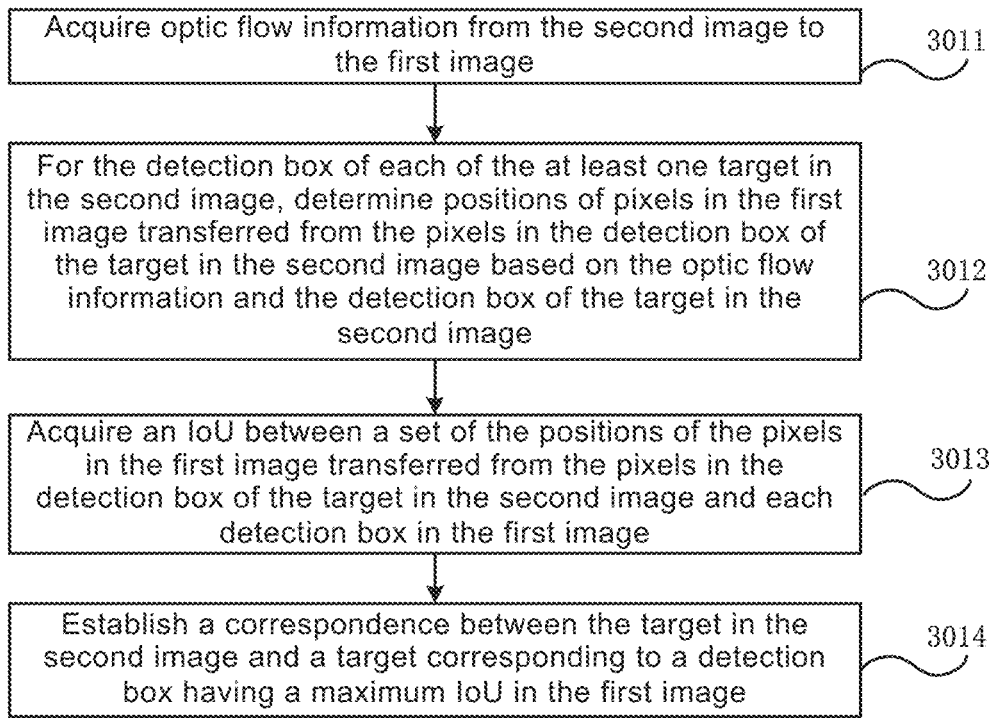
FIG. 5 is a schematic flowchart of a method for detecting motion information of a target provided in further another exemplary embodiment of the present disclosure.

FIG. 5 is a schematic flowchart of a method for detecting motion information of a target provided in further another exemplary embodiment of the present disclosure. As shown in FIG. 5, in some other embodiments, step 301 may include the following steps.

At step 3011, optic flow information from the second image to the first image is acquired.

In embodiments of the present disclosure, optic flow information is used for representing motion or timing sequence information of pixels between images in a video or image sequence. The optic flow information from the second image to the first image, i.e., a two-dimensional motion field of pixels from the second image to the first image, is used for representing the movement of pixels in the second image to the first image. In some embodiments, the vision technology, for example, Open Source Computer Vision Library (OpenCV) may be utilized. For example, the second image and the first image are input to an OpenCV based model, and the optic flow information between the second image and the first image is output by the model.

At step 3012, for the detection box of each of the at least one target in the second image, positions of pixels in the first image transferred from the pixels in the detection box of the target in the second image are determined based on the optic flow information and the detection box of the target in the second image.

At step 3013, an intersection over union (IoU) between a set of the positions of pixels in the first image transferred from the pixels in the detection box of each target in the second image and each detection box in the first image, i.e., a coverage ratio of the set to each detection box in the first image, is acquired.

Alternatively, in some embodiments, an intersection I between the above-described set and each detection box in the first image, and a union U between the above-mentioned set and each detection box in the first image may be acquired, and a ratio of the intersection I to the union U (IoU) between the above-mentioned set and each detection box in the first image is calculated as the coverage ratio of the set to each detection box in the first image.

At step 3014, a correspondence between a target in the second image and a target corresponding to the detection box having the maximum IoU in the first image is established, that is, the target corresponding to the detection box having the maximum IoU in the first image is taken as the one corresponding to the target in the second image.

Based on this embodiment, a set of the positions of the pixels in the first image transferred from the detection box of a target in the second image is determined based on the optic flow information between the two images, and the IoU between the set and each detection box in the first image is acquired. The larger the IoU, the higher the repetition rate of pixels in the detection box in the first image and in the above-mentioned set, and the greater the probability that the detection box having the maximum IoU with the set among the detection boxes in the first image is the detection box of the target in the second image. Thus, the correspondence between targets in two images may be determined accurately and objectively with the optic flow information between the two images and the IoU between the set of the positions of the pixels in the first image transferred from the pixels in the detection box of each target in the second image and each detection box in the first image.

Figure 6:
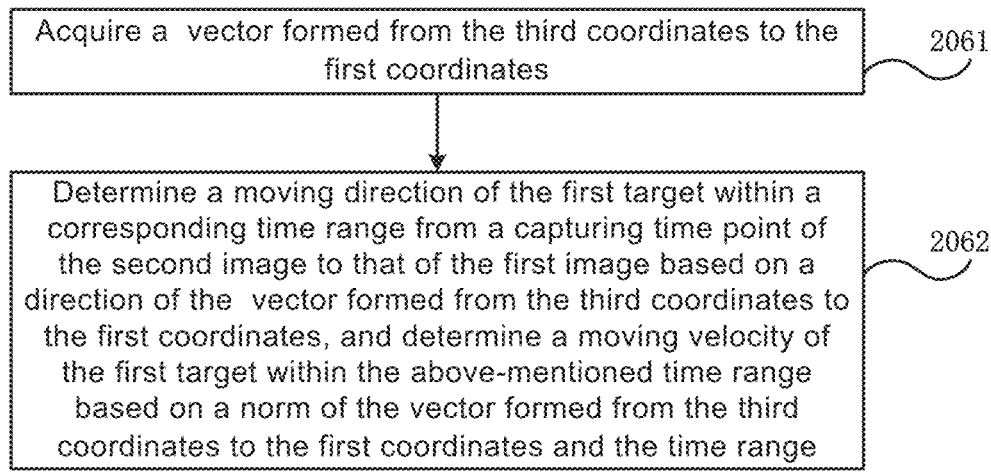
FIG. 6 is a schematic flowchart of a method for detecting motion information of a target provided in yet another exemplary embodiment of the present disclosure.

FIG. 6 is a schematic flowchart of a method for detecting motion information of a target provided in yet another exemplary embodiment of the present disclosure. As shown in FIG. 6, on the basis of the example shown in FIG. 2 or FIG. 3, step 206 may include the following steps.

At step 2061, a vector from the third coordinates to the first coordinates is acquired.

The formed vector from the third coordinates to the first coordinates, i.e., a displacement vector formed from the third coordinates to the first coordinates, is a directed line segment formed from the third coordinates to the first coordinates. The magnitude of the displacement vector is a straight-line distance from the third coordinates to the first coordinates, and the direction of the displacement vector is from the third coordinates to the first coordinates.

At step 2062, the moving direction of the first target within the corresponding time range from the capturing time point of the second image to that of the first image is determined based on the direction of the vector formed from the third coordinates to the first coordinates, and the moving velocity of the first target within the above mentioned time range is determined based on a norm of the vector from the third coordinates to the first coordinates and the above mentioned time range. For example, a ratio of the norm of the vector from the third coordinates to the first coordinates to the above mentioned time range may be acquired as the moving velocity of the first target within the above mentioned time range. The moving direction and the moving velocity of the first target within the above mentioned time range form the motion information of the first target within the above mentioned time range.

Based on this embodiment, the moving direction and the moving velocity of the first target within the corresponding time range may be determined accurately based on the vector formed from the third coordinates to the first coordinates, so that the state of motion of the first target can be known.

Figure 7:
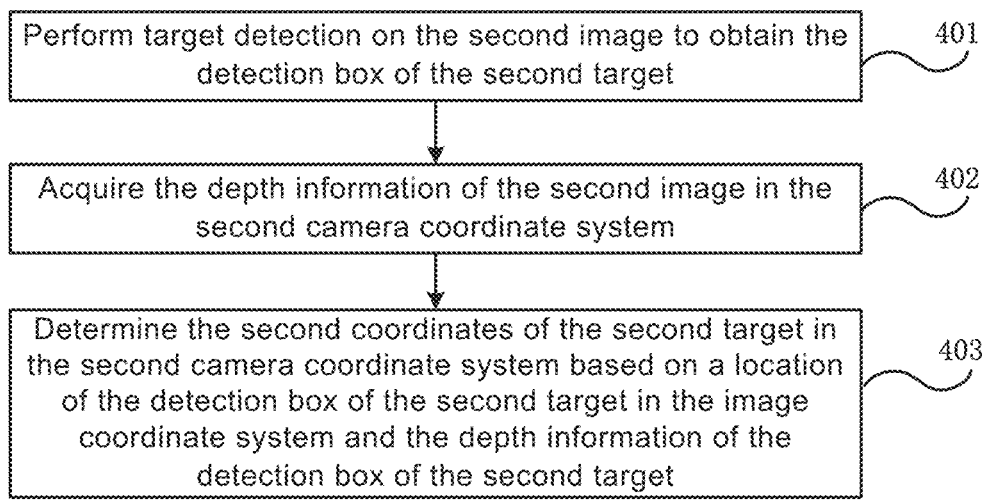
FIG. 7 is a schematic flowchart of a method for detecting motion information of a target provided in still another exemplary embodiment of the present disclosure.

FIG. 7 is a schematic flowchart of a method for detecting motion information of a target provided in still another exemplary embodiment of the present disclosure. As shown in FIG. 7, on the basis of the embodiments shown in FIG. 2 to FIG. 6, the method may further include the following steps before step 205.

At step 401, target detection is performed on the second image to obtain the detection box of the second target.

At step 402, the depth information of the second image in the second camera coordinate system is acquired.

In addition, after the depth information of the second image in the second camera coordinate system is acquired, the depth information of the detection box of the second target is determined based on the depth information of the second image in the second camera coordinate system. The depth information of the detection box of the second target refers to the depth information of the detection box of the second target in the second camera coordinate system.

At step 403, the second coordinates of the second target in the second camera coordinate system are determined based on a location of the detection box of the second target in the image coordinate system and the depth information of the detection box of the second target.

Based on this embodiment, target detection may be performed on the second image which is before the first image in terms of timing in the image sequence and the depth information thereof may be acquired in advance, and then the second coordinates of the second target in the second camera coordinate system are determined therefrom. Thus, the second coordinates of the second target are subsequently transformed directly to determine the motion information of the first target within the corresponding time range. Accordingly, the efficiency of detecting the motion information of a target in a scene is improved.

Alternatively, in some embodiments, based on the embodiment shown in FIG. 7, after the second coordinates of the second target in the second camera coordinate system are determined, the second coordinates of the second target may further be stored for subsequently direct inquiry and use. Accordingly, the efficiency of detecting the motion information of a target in a scene is improved.

Alternatively, the method for detecting motion information of a target described in any above embodiment of the present disclosure may also be performed with the first image as a new second image and a third image behind the first image in terms of timing in the image sequence as a new first image to determine the motion information of a target in the third image within a corresponding time range from the capturing time point of the first image to that of the third image.

Based on this embodiment, the motion information of a target in the images of an image sequence may be detected frame by frame or at intervals of a number of frames. Thus, the motion state of the target in the scene outside the traveling object can be continuously detected in the traveling process of the traveling object. Accordingly, the traveling of the traveling object can be controlled based on the motion state of the target, and safe traveling of the traveling object can be guaranteed.

Figure 8:
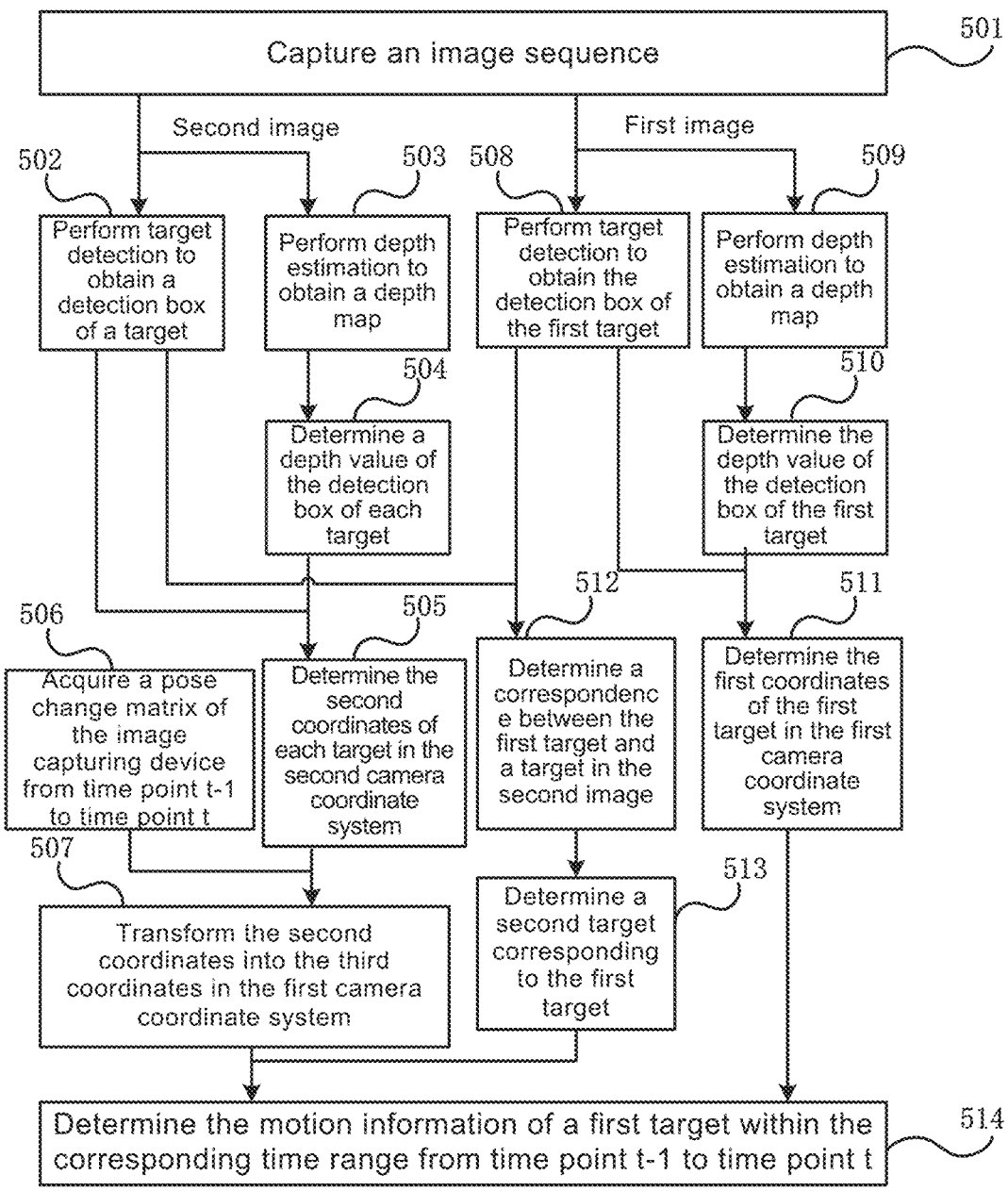
FIG. 8. is a schematic flowchart of an application of a method for detecting motion information of a target provided in an exemplary embodiment of the present disclosure.

FIG. 8. is a schematic flowchart of an application of a method for detecting motion information of a target provided in an exemplary embodiment of the present disclosure. The method for detecting motion information of a target provided in embodiments of the present disclosure is further described below with an application example. As shown in FIG. 8, the application example includes the following steps.

At step 501, in a traveling process of a traveling object, an image capturing device on the traveling object captures images of a scene outside the traveling object to obtain an image sequence.

An image captured at time point t−1 in this image sequence is used as a second image, denoted by $I_{t-1}$, and steps 502 to 505 and step 507 are performed on the second image. An image captured at time point t in this image sequence is used as a first image, denoted by $I_t$, and steps 508 to 511 are performed on the first image. Step 506 is performed for the image capturing device.

At step 502, target detection is performed on the second image $I_{t-1}$ by using a preset target detection framework to obtain a detection box of a target in the second image $I_{t-1}$. Since one or more detection boxes of targets may be detected, a detection box set $BBox_{t-1}$ is used to represent the detected detection box(es) of target(s) in the second image $I_{t-1}$. The detection box of a target numbered as k (hereinafter referred to as target k) at time point t−1 is depicted as:

$$BBox_{t-1}^{k} = (x, y, w, h) \quad \text{Formula (1)}$$

where (x, y) represents coordinates of the detection box of target k in an image coordinate system, and w and h represent a width and a height of the detection box of the target k, respectively.

At step 503, depth estimation is performed on the second image $I_{t-1}$ by using a preset depth estimation approach to obtain a depth map $D_{t-1}$ corresponding to the second image $I_{t-1}$.

The depth map $D_{t-1}$ includes depth values of different pixels in the second image $I_{t-1}$ in a corresponding second camera coordinate system at time point t−1, and the depth value of pixel (i, j) in the second image $I_{t-1}$ in the second camera coordinate system may be expressed as $D_{t-1}^{(i,j)}$.

At step 504, depth values of pixels in the detection box of each target in the second image $I_{t-1}$ are acquired from the depth map $D_{t-1}$ corresponding to the second image $I_{t-1}$, and a depth value of the detection box of each target in the second image $I_{t-1}$ is determined by using a preset approach based on the depth values of the pixels in the detection box of each target in the second image $I_{t-1}$.

The depth values of the pixels in the detection box of each target in the second image $I_{t-1}$ refer to the depth values of the pixels in the detection box of each target in the second image $I_{t-1}$ in the second camera coordinate system.

Continuously taking target k at time point t−1 for example, the depth values of the pixels in the detection box $BBox_{t-1}^{k}$ of target k are acquired from the depth map $D_{t-1}$ corresponding to the second image $I_{t-1}$, and then the depth value $D_{t-1}^{k}$ of the detection box $BBox_{t-1}^{k}$ of target k is determined by using the approach in the above embodiment of the present disclosure based on the depth values of the pixels in the detection box $BBox_{t-1}^{k}$ of target k.

Steps 503-504 and step 502 may be performed simultaneously or in any temporal order, which will not be limited in the embodiments of the present disclosure.

At step 505, for the detection box of each target in the second image $I_{t-1}$, 3D coordinates (second coordinates) of each target in the corresponding second camera coordinate system at time point t−1 are determined based on a location of the detection box of each target in the image coordinate system and the depth value of the detection box of each target.

For example, continuously taking target k at time point t−1 for example, the 3D coordinates $PC_{t-1}^{k}$ of the detection box of target k in the corresponding second camera coordinate system at time point t−1 may be obtained according to:

$$PC_{t-1}^{k} = D_{t-1}^{k} * (K^{-1} * (x, y, 1)^T) \quad \text{Formula (2)}$$

where K is an internal parameter of the image capturing device to indicate an own property of the image capturing device and may be obtained by calibration in advance.

At step 506, a pose change matrix $T_{t-1 \to t}$ of the image capturing device from time point t−1 to time point t is acquired.

Steps 506, steps 502-505 and steps 508-513 may be performed simultaneously or in any temporal order, which will not be limited in the embodiments of the present disclosure.

At step 507, the second coordinates of each target in the second image $I_{t-1}$ in the second camera coordinate system are transformed into 3D coordinates (i.e., the above-mentioned third coordinates) in the first camera coordinate system according to the pose change matrix $T_{t-1 \to t}$.

For example, continuously taking target k at time point t−1 for example, the second coordinates $PC_{t-1}^{k}$ of the detection box of target k in the second image $I_{t-1}$ may be transformed into the third coordinates $PC_t^k$ according to the following formula:

$$PC_t^k = T_{t-1 \to t} * PC_{t-1}^k \quad \text{Formula (3)}$$

At step 508, target detection is performed on the first image $I_t$ by using the preset target detection framework to obtain a detection box of a target (i.e., the above-mentioned first target) in the first image $I_t$. Since one or more detection boxes of targets may be detected, a detection box set $BBox_t$ is used to represent the detection box(es) of the first target(s). The detection box of a target numbered as k~ (hereinafter referred to as target k~) among the first targets at time point t is depicted as:

$$BBox_t^{k\sim} = (x, y, w, h) \quad \text{Formula (4)}$$

where (x, y) represents coordinates of the detection box of target p in the image coordinate system, and w and h represent a width and a height of the detection box of the target k~, respectively.

At step 509, depth estimation is performed on the first image $I_t$ by using the preset depth estimation approach to obtain a depth map $D_t$ corresponding to the first image $I_t$.

The depth map $D_t$ includes depth values of different pixels in the first image $I_t$ in the corresponding first camera coordinate system at time point t, and the depth value of pixel (i, j) in the first image $I_t$ in the first camera coordinate system may be expressed as $D_t^{(i,j)}$.

At step 510, depth values of the pixels in the detection box of the first target are acquired from the depth map $D_t$ corresponding to the first image $I_t$, and a depth value of the detection box of the first target is determined by using the preset approach based on the depth values of the pixels in the detection box of the first target.

The depth value of the detection box of the first target refers to the depth value of the detection box of the first target in the first camera coordinate system.

Continuously taking target k~ at time point t for example, the depth values of the pixels in the detection box $BBox_t^{k\sim}$ of target k~ are acquired from the depth map $D_t$ corresponding to the first image $I_t$, and then the depth value $D_t^{k\sim}$ of the detection box $BBox_t^{k\sim}$ of target k~ is determined by using the approach in the above embodiment of the present disclosure based on the depth values of the pixels in the detection box $BBox_t^{k\sim}$ of target k~.

Steps 509-510 and step 508 may be performed simultaneously or in any temporal order, which will not be limited in the embodiments of the present disclosure.

At step 511, first coordinates of the first target in the corresponding first camera coordinate system at time point t are determined based on a location of the detection box of the first target in the image coordinate system and the depth value of the detection box of the first target.

The first target may be one target or a plurality of targets. In case of a plurality of first targets, for each of the first targets, the 3D coordinates (i.e., the above-mentioned first coordinates) of the detection box of each target in the corresponding first camera coordinate system at time point t are determined based on a location of the detection box of the target in the image coordinate system and the depth value thereof. For example, continuously taking target k~ at time point t for example, the 3D coordinates $PC_t^{k\sim}$ of the detection box of target k~ in the corresponding first camera coordinate system at time point t may be obtained according to the following formula:

$$PC_t^{k\sim} = D_t^{k\sim} * (K^{-1} * (x, y, 1)^T) \quad \text{Formula (5)}$$

where K is the internal parameter of the image capturing device to indicate the own property of the image capturing device and may be obtained by calibration in advance.

At step 512, a correspondence between the first target in the first image $I_{t-1}$ and the target in and second image $I_t$ is determined.

At step 513, the target in the second image that corresponds to the first target is determined as a second target according to the correspondence.

The second target may be one target or a plurality of targets. Corresponding to the first target, the second target may be one target or a plurality of targets. Further, said plurality of targets may be targets of the same type (e.g., all are humans) or targets of different types (e.g., including humans, vehicles, buildings, etc.).

The second target in the second image that corresponds to the first target may be determined by the approach in any of the embodiments shown in FIG. 4 and FIG. 5 at steps 512-513.

Steps 512-513 may be performed after step 502 and step 508, and may be performed simultaneously with other steps described above in the embodiments of this application or in any temporal order, which will not be limited in the embodiments of the present disclosure.

At step 514, the motion information of the first target within the corresponding time range $\Delta_t$ from time point t−1 to time point t is determined based on the first coordinates of the first target and the third coordinates of the corresponding second target.

The first target may be one target or a plurality of targets. In case of a plurality of first targets, step 514 is performed for each first target.

Assuming that the second target k in the second image $I_{t-1}$ corresponds to the first target k~ in the first image $I_t$, the motion information of the first target k~ within the corresponding time range $\Delta t$ is determined based on the first coordinates $PC_t^{k\sim}$ of the first target k~ at time point t and the third coordinates $PC_t^k$ of the corresponding second target k at time point t−1. Specifically, a vector formed from the third coordinates $PC_t^k$ to the first coordinates $PC_t^{k\sim}$ is acquired, and the direction of the vector is used as the moving direction of the first target k~ within the corresponding time range $\Delta_t$, expressed as:

$$O_{t-1,t}^{\Delta k} = PC_t^k - PC_t^{k\sim} \quad \text{Formula (6)}$$

The norm $\|O_{t-1,t}^{\Delta k}\|$ of the vector formed from the third coordinates $PC_t^k$ to the first coordinates $PC_t^{k\sim}$ is acquired, and the moving velocity v of the first target k~ within the corresponding time range $\Delta_t$ is acquired according to the following formula:

$$v = \frac{\|O_{t-1,t}^{\Delta k}\|}{\Delta_t} \quad \text{Formula (7)}$$

Figure 9:
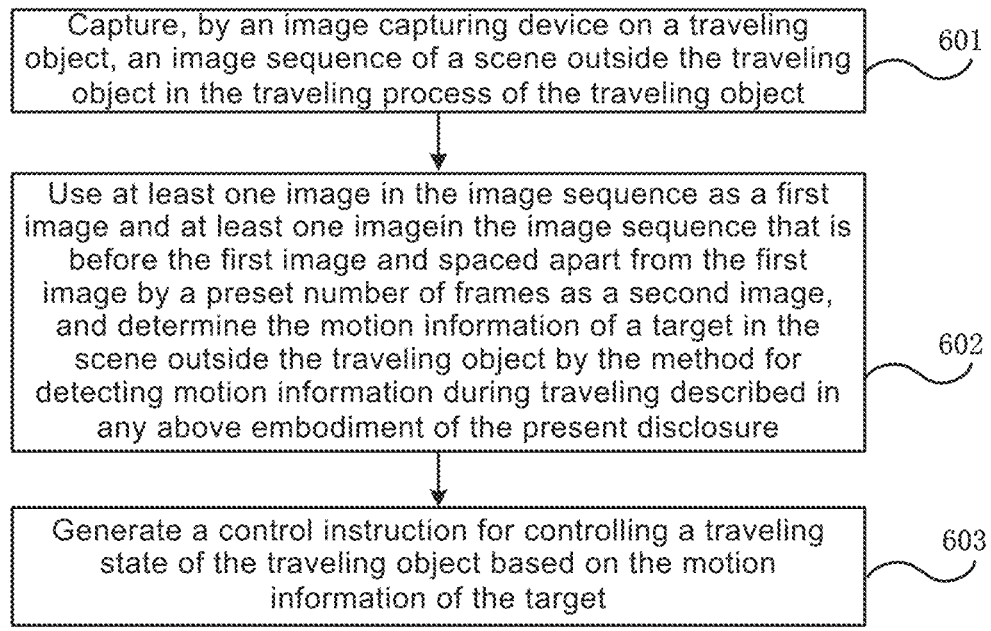
FIG. 9 is a schematic flowchart of a method for controlling a traveling object based on motion information of a target provided in an exemplary embodiment of the present disclosure.

FIG. 9 is a schematic flowchart of a method for controlling a traveling object based on motion information of a target provided in an exemplary embodiment of the present disclosure. This embodiment may be applied to a traveling object such as a vehicle, a robot, and a toy vehicle. As shown in FIG. 9, the method for controlling a traveling object based on motion information of a target provided in this embodiment includes the following steps.

At step 601, in a traveling process of a traveling object, an image capturing device on the traveling object captures an image sequence of a scene outside the traveling object.

At step 602, at least one image in the image sequence is used as a first image, while at least one image in the image sequence that is before the first image and spaced apart from the first image by a preset number of frames is used as a second image, and the motion information of a target in the scene outside the traveling object is determined by the method for detecting motion information during traveling described in any above embodiment of the present disclosure.

At step 603, a control instruction for controlling a traveling state of the traveling object is generated based on the motion information of the target, in order to control the traveling state of the traveling object.

Based on this embodiment, in the traveling process of the traveling object, the motion information of the target in the driving scene may be determined by using the method for detecting motion information during traveling described in any above embodiment of the present disclosure, and then the control instruction for controlling the traveling state of the traveling object is generated based on the motion information of the target. Thus, the detection of the motion information of the target in the driving scene by using the computer vision technology, and the intelligent driving control on the traveling object are realized. Further, it can facilitate to meet real-time intelligent driving control on the traveling object in the scenario of unmanned driving, in order to guarantee safe traveling of the traveling object.

Alternatively, in some embodiments, the above mentioned control instruction, for example, may include but be not limited to at least one of a control instruction for maintaining the magnitude of moving velocity, a control instruction for adjusting the magnitude of moving velocity (e.g., a control instruction for deceleration, a control instruction for acceleration), a control instruction for maintaining a moving direction, a control instruction for adjusting a moving direction (e.g., a control instruction for left turning, a control instruction for right turning, a control instruction for merging to a left lane, or a control instruction for merging to a right lane), a control instruction for pre-warning (e.g., a prompt message of paying attention to a target ahead), a control instruction for switching a driving mode (e.g., a control instruction for switching to an automatic cruise driving mode, a control instruction for switching to a manned driving mode), etc. The control instruction in the embodiments of the present disclosure may be set as required in practice and is not limited to the control instructions listed above.

The method for detecting motion information of a target or the method for controlling a traveling object based on motion information of a target provided in any above embodiment of the present disclosure may be performed by any appropriate device having data processing capability which includes but is not limited to a terminal device, a server, etc. Alternatively, the method for detecting motion information of a target or the method for controlling a traveling object based on motion information of a target provided in any above embodiment of the present disclosure may be performed by a processor. For example, the processor performs the method for detecting motion information of a target or the method for controlling a traveling object based on motion information of a target provided in any above embodiment of the present disclosure by calling corresponding instructions stored on a memory. The methods will not be redundantly described below.

Example Apparatus

Figure 10:
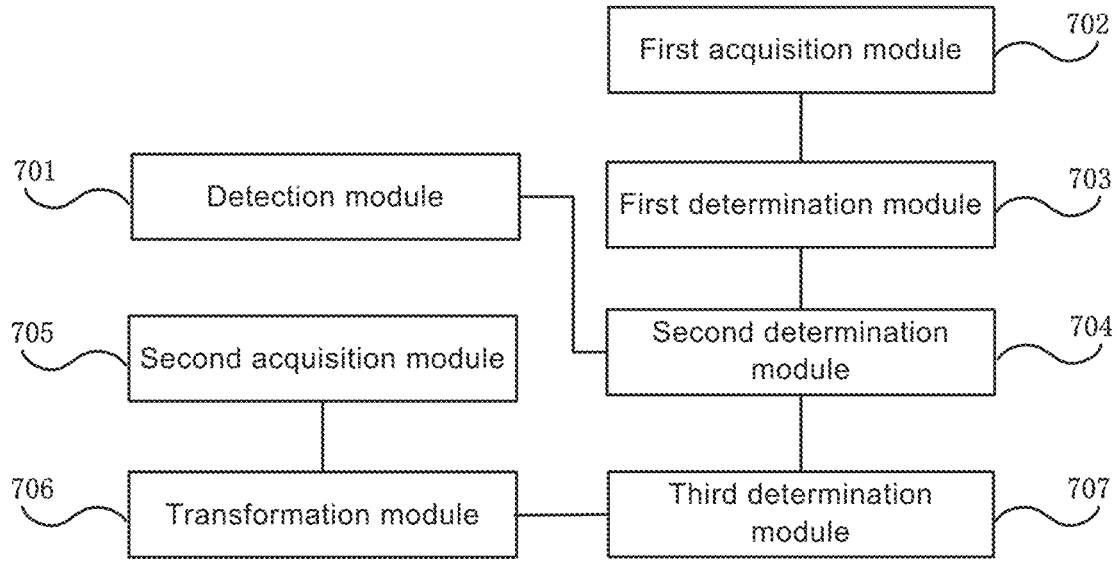
FIG. 10 is a structural schematic diagram of an apparatus for detecting motion information of a target provided in an exemplary embodiment of the present disclosure.

FIG. 10 is a structural schematic diagram of an apparatus for detecting motion information of a target provided in an exemplary embodiment of the present disclosure. The apparatus for detecting motion information of a target may be disposed in an electronic device such as a terminal device and a server, or on a traveling object such as a vehicle, a robot and a toy vehicle to perform the method for detecting motion information of a target provided in any above embodiment of the present disclosure. As shown in FIG. 10, the apparatus for detecting motion information of a target includes a detection module 701, a first acquisition module 702, a first determination module 703, a second determination module 704, a second acquisition module 705, a transformation module 706, and a third determination module 707.

The detection module 701 is configured to perform target detection on a first image to obtain a detection box of a first target, where the first image is an image of a scene outside a traveling object that is captured by an image capturing device on the traveling object in the traveling process of the traveling object.

The first acquisition module 702 is configured to acquire depth information of the first image in a corresponding first camera coordinate system.

The first determination module 703 is configured to determine depth information of the detection box of the first target based on the depth information of the first image acquired by the first acquisition module 702.

The second determination module 704 is configured to determine first coordinates of the first target in the first camera coordinate system based on a location of the detection box of the first target obtained by the detection module 701 in an image coordinate system and the depth information of the detection box of the first target determined by the first determination module 703.

The second acquisition module 705 is configured to acquire pose change information of the image capturing device from the capturing of a second image to the capturing of the first image. The second image is an image that is before the first image in terms of timing and spaced apart from the first image by a preset number of frames in an image sequence where the first image is present.

The transformation module 706 is configured to transform second coordinates of a second target in a second camera coordinate system corresponding to the second image into third coordinates in the first camera coordinate system based on the pose change information acquired by the second acquisition module 705. The second target is a target in the second image that corresponds to the first target.

The third determination module 707 is configured to determine motion information of the first target within a corresponding time range from a capturing time point of the second image to that of the first image based on the first coordinates determined by the second determination module 704 and the third coordinates transformed by the transformation module 706.

Based on this embodiment, by using the computer vision technology, the motion information of the target in the driving scene is obtained based on captured images of the scene outside the traveling object in the traveling process of the traveling object without the help of LiDAR. Compared with the approach of acquiring the moving velocity and direction of a target by LiDAR, since there is no need to emit a high-frequency laser beam to establish point cloud data, perform target detection and target tracking on two pieces of point cloud data and calculate the moving velocity and direction of the target, a large amount of computational processing can be avoided and the processing time can be saved with improved processing efficiency, helping meet the high real-time requirements of unmanned driving and other scenarios.

Figure 11:
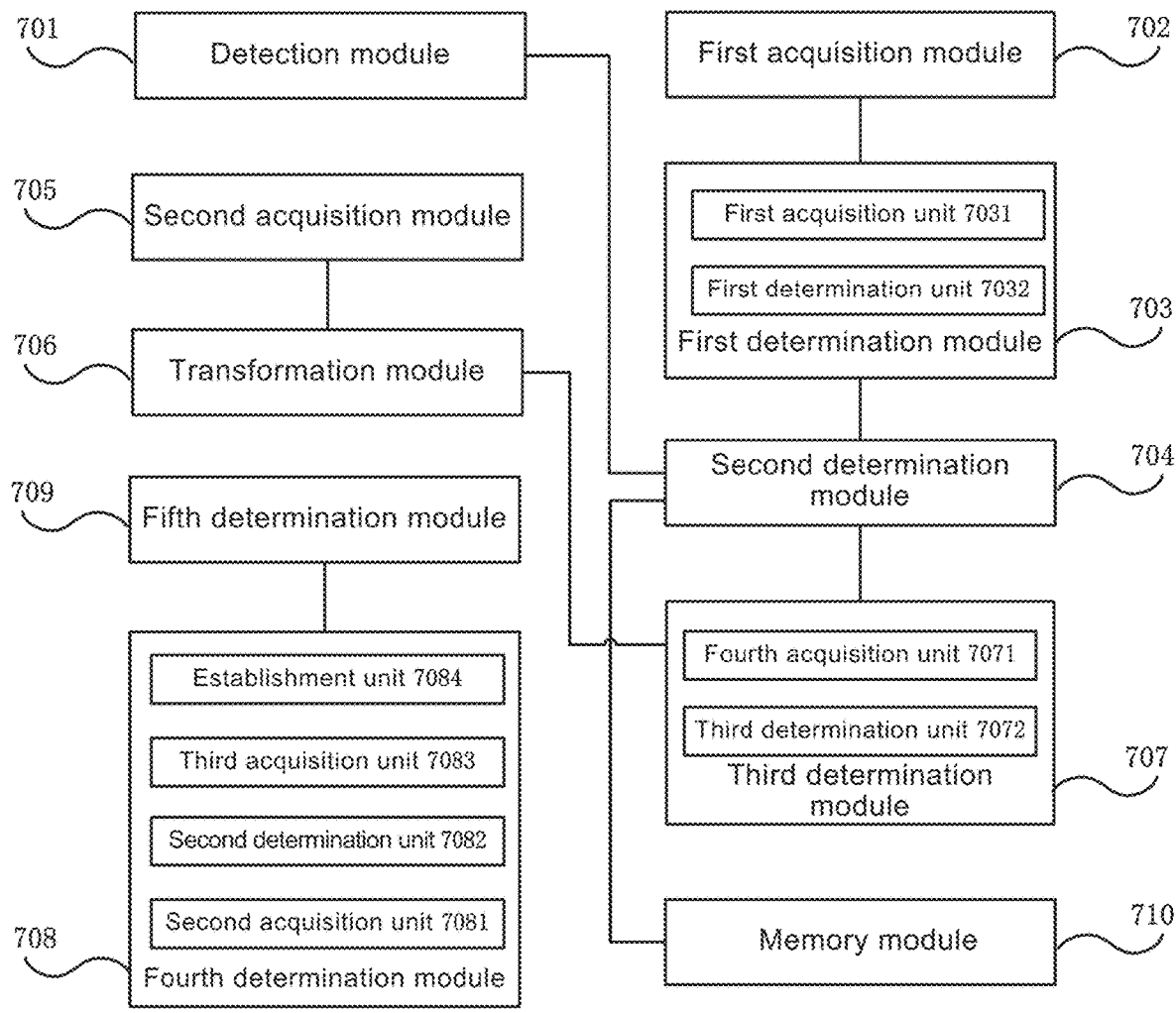
FIG. 11 is a structural schematic diagram of an apparatus for detecting motion information of a target provided in another exemplary embodiment of the present disclosure.

FIG. 11 is a structural schematic diagram of an apparatus for detecting motion information of a target provided in another exemplary embodiment of the present disclosure. As shown in FIG. 11, on the basis of the embodiment shown in FIG. 10, in the apparatus for detecting motion information of a target provided in this embodiment, the first determination module 703 includes: a first acquisition unit 7031 configured to acquire depth values of pixels in the detection box of the first target from the depth information of the first image; and a first determination unit 7032 configured to determine the depth information of the detection box of the first target by using a preset approach based on the depth values of the pixels in the detection box of the first target acquired by the first acquisition unit 7031.

Alternatively, in some embodiments, the first determination unit 7032 is specifically configured to select a depth value occurring most frequently among the depth values of the pixels in the detection box of the first target acquired by the first acquisition unit 7031 as the depth information of the detection box of the first target.

Alternatively, in some other embodiments, the first determination unit 7032 is specifically configured to, among the pixels in the detection box of the first target, separately determine the number of pixels having their depth values falling within a same preset depth value range, and determine the depth information of the detection box of the first target based on the depth value range corresponding to the largest number of pixels having their depth values falling within the same depth value range.

Alternatively, in still some other embodiments, the first determination unit 7032 is specifically configured to acquire an average value of the depth values of the pixels in the detection box of the first target as the depth information of the detection box of the first target.

Alternatively, referring continuously to FIG. 11, the apparatus for detecting motion information of a target provided in the above embodiment may further include a fourth determination module 708 and a fifth determination module 709.

The fourth determination module 708 is configured to determine a correspondence between at least one target in the first image and at least one target in the second image, where the target(s) in the first image includes the above-mentioned first target.

The fifth determination module 709 is configured to determine a target in the second image that corresponds to the first target as the above-mentioned second target according to the correspondence determined by the fourth determination module 708.

Alternatively, in some embodiments, the fourth determination module 708 is specifically configured to track the detection box of at least one target in the second image to obtain the correspondence between at least one target in the first image and at least one target in the second image.

Alternatively, in some other embodiments, the fourth determination module 708 may include: a second acquisition unit 7081 configured to acquire optic flow information from the second image to the first image; a second determination unit 7082 configured to, for the detection box of each of the at least one target in the second image, determine positions of pixels in the first image transferred from the pixels in the detection box of the target in the second image based on the optic flow information and the detection box of the target in the second image; a third acquisition unit 7083 configured to acquire an IoU between a set of the positions of the pixels in the first image transferred from the pixels in the detection box of a target in the second image and each detection box in the first image; and an establishment unit 7084 configured to establish a correspondence between a target in the second image and a target corresponding to the detection box having the maximum IoU in the first image.

Alternatively, referring continuously to FIG. 11, in some embodiments, the third determination module 707 includes: a fourth acquisition unit 7071 configured to acquire a vector formed from the third coordinates to the first coordinates; and a third determination unit 7072 configured to determine the moving direction of the first target within the above-mentioned time range based on the direction of the vector acquired by the fourth acquisition unit 7071, and determine the moving velocity of the first target within the above mentioned time range based on the norm of the vector and the time range.

Alternatively, in the apparatus for detecting motion information of a target described in each above embodiment, the detection module 701 is further configured to perform target detection on the second image to obtain the detection box of the second target. The first acquisition module 702 may be further configured to acquire depth information of the second image in the second camera coordinate system. The second determination module 704 may be further configured to determine second coordinates of the second target in the second camera coordinate system based on a location of the detection box of the second target obtained by the detection module 701 in the image coordinate system and the depth information of the detection box of the second target determined by the first determination module 703.

Alternatively, referring continuously to FIG. 11, the apparatus for detecting motion information of a target described in the above embodiments may further include a memory module 710 configured to store the second coordinates of the second target determined by the second determination module 704.

Alternatively, in the apparatus for detecting motion information of a target described in the above embodiments, the first image may also be used as a new second image, while a third image behind the first image in terms of timing in the image sequence as a new first image, and corresponding operations are performed by the modules in the apparatus for detecting motion information of a target to determine the motion information of a target in the third image within a corresponding time range from the capturing time point of the first image to that of the third image.

Figure 12:
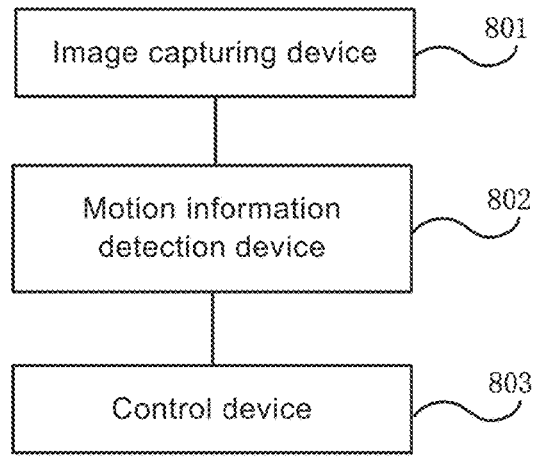
FIG. 12 is a structural schematic diagram of an apparatus for controlling a traveling object based on motion information of a target provided in an exemplary embodiment of the present disclosure.

FIG. 12 is a structural schematic diagram of an apparatus for controlling a traveling object based on motion information of a target provided in an exemplary embodiment of the present disclosure. The apparatus for controlling a traveling object based on motion information of a target during traveling may be disposed on a traveling object such as a vehicle, a robot and a toy vehicle to control the traveling object based on the motion information of a target. As shown in FIG. 12, the apparatus for controlling a traveling object based on motion information of a target includes an image capturing device 801, a motion information detection device 802, and a control device 803.

The image capturing device 801 is disposed on the traveling object and configured to capture an image sequence of the scene outside the traveling object in the traveling process of the traveling object.

The motion information detection device 802 is configured to use at least one image in the image sequence as a first image and at least one image in the image sequence that is before the first image and spaced apart from the first image by a preset number of frames as a second image, and determine the motion information of a target in the scene outside the traveling object. The motion information detection device 802 may be specifically implemented by the apparatus for detecting motion information of a target described in any embodiment shown in FIG. 10 and FIG. 11.

The control device 803 is configured to generate a control instruction for controlling a traveling state of the traveling object based on the motion information of the target detected by the motion information detection device 802.

Based on this embodiment, in the traveling process of a traveling object, an image sequence of the scene outside the traveling object is captured by the image capturing device on the traveling object, and at least one image in the image sequence is used as a first image, while at least one image in the image sequence that is before the first image and spaced apart from the first image by a preset number of frames is used as a second image, then the motion information of the target in the driving scene is determined by using the method for detecting motion information of a target described in any above embodiment of the present disclosure, and then the control instruction for controlling the traveling state of the traveling object is generated based on the motion information of the target. Thus, the detection of the motion information of the target in the driving scene by using the computer vision technology and intelligent driving control on the traveling object are realized, which facilitate to meet real-time intelligent driving control on the traveling object in the scenario of unmanned driving to guarantee safe traveling of the traveling object.

Alternatively, in some embodiments, the control instruction, for example, may include but be not limited to at least one of a control instruction for maintaining a moving velocity, a control instruction for adjusting the magnitude of moving velocity, a control instruction for maintaining the magnitude of moving direction, a control instruction for adjusting a moving direction, a control instruction for pre-warning, a control instruction for switching a driving mode, etc.

Example Electronic Device

Figure 13:
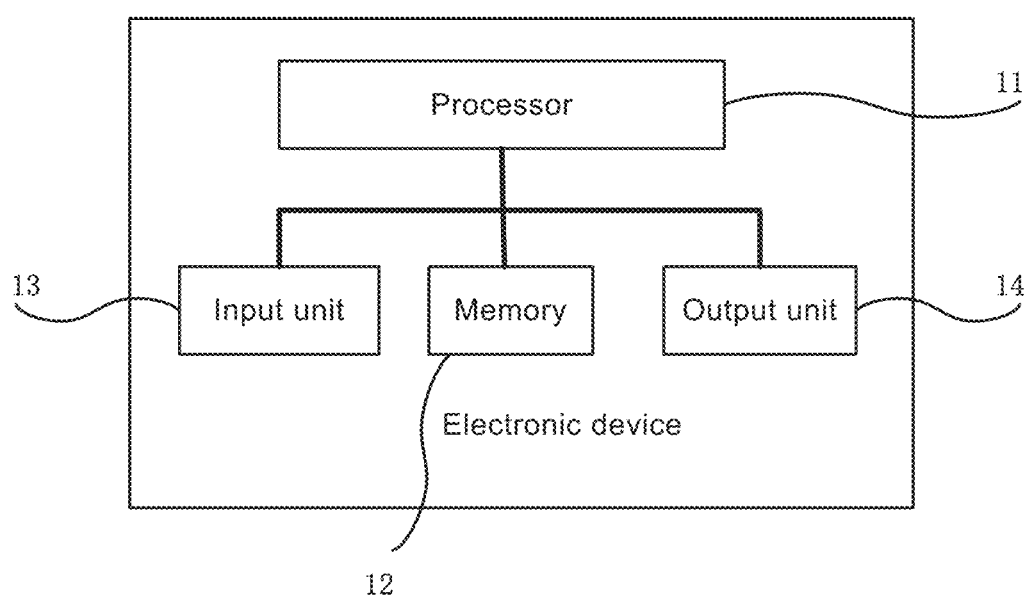
FIG. 13 is a structure diagram of an electronic device provided in an exemplary embodiment of the present disclosure.

Hereinafter, an electronic device according to an embodiment of the present disclosure is described with reference to FIG. 13. FIG. 13 illustrates a block diagram of an electronic device according to an embodiment of the present disclosure. As shown in FIG. 13, the electronic device includes one or more processors 11 and a memory 12.

The processor 11 may be a central processing unit (CPU) or a processing unit in other form having data processing capability and/or instruction execution capability, and can control other components in the electronic device 10 to execute desired functions.

The memory 12 may include one or more computer program products. The computer program product may include a computer readable storage medium in any form, for example, a volatile memory and/or a nonvolatile memory. The volatile memory may include, for example, a random access memory (RAM) and/or a cache, etc. The nonvolatile memory may include, for example, a read-only memory (ROM), a hard disk, a flash memory, etc. One or more computer program instructions may be stored on the computer readable storage medium, and such program instructions can be run by the processor 11 to implement the method for detecting motion information of a target or the method for controlling a traveling object based on motion information of a target described in above embodiments of the present disclosure, and/or other desired functions. Various contents such as depth information of images, depth information of detection boxes of targets and pose change information of an image capturing device may also be stored in the computer readable storage medium.

In an example, the electronic device 10 may further include an input unit 13 and an output unit 14 that are interconnected by means of a bus system and/or a connection mechanism in other form (not shown).

For example, the input unit 13 may be a microphone or a microphone array. Alternatively, the input unit 13 may be a communication network connector.

Moreover, the input unit 13 may also include, for example, a keyboard, a mouse, etc.

The output unit 14 may output various kinds of information outwards, including the determined motion information of the first target in the corresponding time range from the capturing time point of the second image to that of the first image, etc. The output unit 14 may include, for example, a display, a loudspeaker, a printer, a communication network and a remote output unit linked thereto, etc.

As a matter of course, for the sake of simplification, FIG. 13 merely illustrates some of components related to the present disclosure in the electronic device 10 with components such as a bus and an input/output interface being omitted. In addition, according to specific applications, the electronic device 10 may also include any other appropriate components.

Example Computer Program Product and Computer Readable Storage Medium

In addition to the above methods and apparatuses, an embodiment of the present disclosure may also provide a computer program product that includes computer program instructions causing, when run by a processor, the processor to perform the steps in the method for detecting motion information of a target or the method for controlling a traveling object based on motion information of a target according to the embodiments of the present disclosure described in the section "Example Method" of this description.

The computer program product may have program codes for executing the operations in the embodiments of the present disclosure written by using one or more programming languages or a combination thereof. The programming languages include object oriented programming languages, such as Java and C++ or the like, and also include conventional procedural programming languages, such as C language or similar programming languages. The program code can be executed fully on a user's computer, executed partially on a user's computer, executed as an independent software package, executed partially on a user's computer and partially on a remote computer, or executed fully on a remote computer or a server.

Furthermore, an embodiment of the present disclosure may also provide a computer readable storage medium that stores thereon computer program instructions causing, when run by a processor, the processor to perform the steps in the method for detecting motion information of a target or the method for controlling a traveling object based on motion information of a target according to the various embodiments of the present disclosure described in the section "Example Method" of this description.

The computer readable storage medium may be one readable medium or any combination of a plurality of readable media. The readable medium may be a readable signal medium or a readable storage medium. The readable storage medium, for example, may include but be not limited to an electric, magnetic, optical, electromagnetic, infrared, or semiconductor system, apparatus or device, or any combination thereof. More specific examples (a non-exhaustive list) of the readable storage medium include an electrical connection with one or more wires, a portable disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination thereof.

The basic principles of the present disclosure are described above in conjunction with specific embodiments. However, it needs to be noted that the merits, advantages, effects and the like mentioned in the present disclosure are merely illustrative and non-limiting, and cannot be construed as necessary for each embodiment of the present disclosure. In addition, the specific details disclosed above are merely for the purposes of illustration and facilitating understanding rather than limiting. These details are not intended to limit that the present disclosure must be implemented with such specific details.

The embodiments are described herein in a progressive manner. Each embodiment focuses on the difference from another embodiment, and the same and or similar parts between the embodiments may refer to each other. The system embodiments basically correspond to the method embodiments and thus are described simply. For the related parts, a reference can be made to the descriptions of the method embodiments.

The blocks diagrams of the components, apparatuses, devices and systems involved in the present disclosure are merely exemplary and not intended to require or imply that connection, arrangement or configuration must be made as shown in the block diagrams. $I_t$ will be recognized by those skilled in the art that such components, apparatuses, devices and systems may be connected, arranged or configured in any manner. The terms such as "comprise", "include", "have" and their variants are open words, mean "including but not limited to", and may be used interchangeably. As used herein, the terms "or" and "and" refer to the term "and/or", which may be used interchangeably, unless the context clearly indicates the opposite. As used herein, the term "such as" refers to the phrase "such as but not limited to", which may be used interchangeably.

The methods and apparatuses of the present disclosure may be implemented in many ways. For example, the methods and apparatuses of the present disclosure may be implemented by software, hardware, firmware, or any combination of software, hardware and firmware. The above-mentioned sequence of the steps of the method is merely for description. The steps of the methods of the present disclosure are not limited to the sequences specifically described above, unless specially stated otherwise. In addition, in some embodiments, the present disclosure may also be implemented as programs recorded in a recording medium, and these programs include machine-readable instructions for implementing the methods of the present disclosure. Therefore, the present disclosure also encompasses recording media that store thereon programs for performing the methods of the present disclosure.

It also needs to be noted that the components or the steps in the apparatuses, devices and methods of the present disclosure may be decomposed or recombined. Such decompositions and/or recombinations shall all be considered as equivalent solutions of the present disclosure.

The foregoing descriptions of the aspects of the present disclosure are provided to enable any person skilled in the art to make or use the present disclosure. Various modifications to these aspects will be apparent to those skilled in the art, and the general principles defined herein may be applied to other aspects without departing from the scope of the present disclosure. Therefore, the present disclosure is not intended to be limited to the aspects shown herein, and shall accord with the widest scope consistent with the principles and novel features disclosed herein.

The above descriptions are made for the purposes of illustration and description. Moreover, this description is not meant to limit the embodiments of the present disclosure to the forms disclosed herein. While a plurality of example aspects and embodiments are discussed above, some variations, modifications, changes, additions and sub-combinations made thereto will be recognized by those skilled in the art.

What is claimed is:

1. A method for detecting motion information of a target, comprising:

performing target detection on a first image to obtain a detection box of a first target, wherein the first image is an image of a scene outside a traveling object that is captured by an image capturing device on the traveling object in a traveling process of the traveling object;

acquiring depth information of the first image in a corresponding first camera coordinate system;

determining depth information of the detection box of the first target based on the depth information of the first image in the corresponding first camera coordinate system, and determining first coordinates of the first target in the first camera coordinate system based on a location of the detection box of the first target in an image coordinate system and the depth information of the detection box of the first target;

acquiring pose change information of the image capturing device from capturing of a second image to capturing of the first image, wherein the second image is an image that is before the first image in terms of timing and spaced apart from the first image by a preset number of frames in an image sequence where the first image is present;

transforming second coordinates of a second target in a second camera coordinate system corresponding to the second image into third coordinates in the first camera coordinate system based on the pose change information, wherein the second target is a target in the second image that corresponds to the first target; and determining motion information of the first target within a corresponding time range from a capturing time point of the second image to that of the first image based on the first coordinates and the third coordinates.

2. The method according to claim 1, wherein the determining depth information of the detection box of the first target based on the depth information of the first image in the corresponding first camera coordinate system comprises:
acquiring depth values of pixels in the detection box of the first target from the depth information of the first image; and
determining the depth information of the detection box of the first target by using a preset approach based on the depth values of the pixels in the detection box of the first target.

3. The method according to claim 1, before the transforming second coordinates of a second target in a second camera coordinate system corresponding to the second image into third coordinates in the first camera coordinate system based on the pose change information, further comprising:
determining a correspondence between at least one target in the first image and at least one target in the second image, wherein the at least one target in the first image comprises the first target; and
determining a target in the second image that corresponds to the first target as the second target according to the correspondence.

4. The method according to claim 3, wherein the determining a correspondence between at least one target in the first image and at least one target in the second image comprises:
tracking a detection box of at least one target in the second image to obtain the correspondence between the at least one target in the first image and the at least one target in the second image;
or,
acquiring optic flow information from the second image to the first image;
for the detection box of each of the at least one target in the second image, determining positions of pixels in the first image transferred from the pixels in the detection box of the target in the second image based on the optic flow information and the detection box of the target in the second image;
acquiring an intersection over union (IoU) between a set of the positions of the pixels in the first image transferred from the pixels in the detection box of the target and each detection box in the first image; and
establishing a correspondence between the target in the second image and a target corresponding to a detection box having a maximum IoU in the first image.

5. The method according to claim 1, wherein the determining motion information of the first target within a corresponding time range from a capturing time point of the second image to that of the first image based on the first coordinates and the third coordinates comprises:
acquiring a vector formed from the third coordinates to the first coordinates; and
determining a moving direction of the first target within the time range based on a direction of the vector, and determining a moving velocity of the first target within the time range based on a norm of the vector and the time range, wherein the motion information of the first target within the time range comprises the moving direction and the moving velocity of the first target within the time range.

6. The method according to claim 1, before the transforming second coordinates of a second target in a second camera coordinate system corresponding to the second image into third coordinates in the first camera coordinate system based on the pose change information, further comprising:
performing target detection on the second image to obtain a detection box of the second target;
acquiring depth information of the second image in the second camera coordinate system, and determining depth information of the detection box of the second target based on the depth information of the second image in the second camera coordinate system; and
determining the second coordinates of the second target in the second camera coordinate system based on a location of the detection box of the second target in the image coordinate system and the depth information of the detection box of the second target.

7. A method for controlling a traveling object based on motion information of a target, comprising:
capturing, by an image capturing device on a traveling object, an image sequence of a scene outside the traveling object in a traveling process of the traveling object;
using at least one image in the image sequence as a first image and at least one image in the image sequence that is before the first image and spaced apart from the first image by a preset number of frames as a second image, and determining motion information of a target in the scene by using a method for detecting motion information on a target; and
generating a control instruction for controlling a traveling state of the traveling object based on the motion information of the target,
wherein the method for detecting motion information of a target comprises:
performing target detection on a first image to obtain a detection box of a first target, wherein the first image is an image of a scene outside a traveling object that is captured by an image capturing device on the traveling object in a traveling process of the traveling object;
acquiring depth information of the first image in a corresponding first camera coordinate system;
determining depth information of the detection box of the first target based on the depth information of the first image, and determining first coordinates of the first target in the first camera coordinate system based on a location of the detection box of the first target in an image coordinate system and the depth information of the detection box of the first target;
acquiring pose change information of the image capturing device from capturing of a second image to capturing of the first image, wherein the second image is an image that is before the first image in terms of timing and spaced apart from the first image by a preset number of frames in an image sequence where the first image is present;
transforming second coordinates of a second target in a second camera coordinate system corresponding to the second image into third coordinates in the first camera coordinate system based on the pose change information, wherein the second target is a target in the second image that corresponds to the first target; and
determining motion information of the first target within a corresponding time range from a capturing time point of the second image to that of the first image based on the first coordinates and the third coordinates.

8. A non-transitory computer readable storage medium that stores thereon a computer program configured to perform a method for detecting motion information of a target comprising:
performing target detection on a first image to obtain a detection box of a first target, wherein the first image is an image of a scene outside a traveling object that is captured by an image capturing device on the traveling object in a traveling process of the traveling object;
acquiring depth information of the first image in a corresponding first camera coordinate system;
determining depth information of the detection box of the first target based on the depth information of the first image, and determining first coordinates of the first target in the first camera coordinate system based on a location of the detection box of the first target in an image coordinate system and the depth information of the detection box of the first target;
acquiring pose change information of the image capturing device from capturing of a second image to capturing of the first image, wherein the second image is an image that is before the first image in terms of timing and spaced apart from the first image by a preset number of frames in an image sequence where the first image is present;
transforming second coordinates of a second target in a second camera coordinate system corresponding to the second image into third coordinates in the first camera coordinate system based on the pose change information, wherein the second target is a target in the second image that corresponds to the first target; and
determining motion information of the first target within a corresponding time range from a capturing time point of the second image to that of the first image based on the first coordinates and the third coordinates.

9. The method according to claim 2, wherein the determining the depth information of the detection box of the first target by using a preset approach based on the depth values of the pixels in the detection box of the first target comprises:
selecting a depth value occurring most frequently among the depth values of the pixels in the detection box of the first target as the depth information of the detection box of the first target; or
among the pixels in the detection box of the first target, separately determining a number of pixels having their depth values falling within a same preset depth value range, and then determining the depth information of the detection box of the first target based on the depth value range corresponding to the largest number of pixels having their depth values falling within the same depth value range; or
acquiring an average value of the depth values of the pixels in the detection box of the first target as the depth information of the detection box of the first target.

10. The method according to claim 4, wherein the acquiring an intersection over union (IoU) between a set of the positions of the pixels in the first image transferred from the pixels in the detection box of the target and each detection box in the first image comprises:
acquiring an intersection I between the set of the positions of the pixels and each detection box in the first image, and a union U between the set of the positions of the pixels and each detection box in the first image, and calculating a ratio of the intersection I to the union U (IoU) between the set of the positions of the pixels and each detection box in the first image as the coverage ratio of the set to each detection box in the first image.

11. The method according to claim 6, wherein the method further comprises:
after the second coordinates of the second target in the second camera coordinate system are determined, storing the second coordinates of the second target for subsequently direct inquiry and use.

12. The method according to claim 2, before the transforming second coordinates of a second target in a second camera coordinate system corresponding to the second image into third coordinates in the first camera coordinate system based on the pose change information, further comprising:
performing target detection on the second image to obtain a detection box of the second target;
acquiring depth information of the second image in the second camera coordinate system, and determining depth information of the detection box of the second target based on the depth information of the second image in the second camera coordinate system; and
determining the second coordinates of the second target in the second camera coordinate system based on a location of the detection box of the second target in the image coordinate system and the depth information of the detection box of the second target.

13. The method according to claim 3, before the transforming second coordinates of a second target in a second camera coordinate system corresponding to the second image into third coordinates in the first camera coordinate system based on the pose change information, further comprising:
performing target detection on the second image to obtain a detection box of the second target;
acquiring depth information of the second image in the second camera coordinate system, and determining depth information of the detection box of the second target based on the depth information of the second image in the second camera coordinate system; and
determining the second coordinates of the second target in the second camera coordinate system based on a location of the detection box of the second target in the image coordinate system and the depth information of the detection box of the second target.

14. The method according to claim 4, before the transforming second coordinates of a second target in a second camera coordinate system corresponding to the second image into third coordinates in the first camera coordinate system based on the pose change information, further comprising:
performing target detection on the second image to obtain a detection box of the second target;
acquiring depth information of the second image in the second camera coordinate system, and determining depth information of the detection box of the second target based on the depth information of the second image in the second camera coordinate system; and
determining the second coordinates of the second target in the second camera coordinate system based on a location of the detection box of the second target in the image coordinate system and the depth information of the detection box of the second target.

15. The method according to claim 5, before the transforming second coordinates of a second target in a second camera coordinate system corresponding to the second image into third coordinates in the first camera coordinate system based on the pose change information, further comprising:

performing target detection on the second image to obtain a detection box of the second target;

acquiring depth information of the second image in the second camera coordinate system, and determining depth information of the detection box of the second target based on the depth information of the second image in the second camera coordinate system; and determining the second coordinates of the second target in the second camera coordinate system based on a location of the detection box of the second target in the image coordinate system and the depth information of the detection box of the second target.

16. The method for controlling a traveling object based on motion information of a target according to claim 7, wherein the determining depth information of the detection box of the first target based on the depth information of the first image in a corresponding first camera coordinate system comprises:

acquiring depth values of pixels in the detection box of the first target from the depth information of the first image; and determining the depth information of the detection box of the first target by using a preset approach based on the depth values of the pixels in the detection box of the first target.

17. The method for controlling a traveling object based on motion information of a target according to claim 7, before the transforming second coordinates of a second target in a second camera coordinate system corresponding to the second image into third coordinates in the first camera coordinate system based on the pose change information, further comprising:

determining a correspondence between at least one target in the first image and at least one target in the second image, wherein the at least one target in the first image comprises the first target; and determining a target in the second image that corresponds to the first target as the second target according to the correspondence.

18. The method for controlling a traveling object based on motion information of a target according to claim 17, wherein the determining a correspondence between at least one target in the first image and at least one target in the second image comprises:

tracking a detection box of at least one target in the second image to obtain the correspondence between the at least one target in the first image and the at least one target in the second image;

or, acquiring optic flow information from the second image to the first image;

for the detection box of each of the at least one target in the second image, determining positions of pixels in the first image transferred from the pixels in the detection box of the target in the second image based on the optic flow information and the detection box of the target in the second image;

acquiring an intersection over union (IoU) between a set of the positions of the pixels in the first image transferred from the pixels in the detection box of the target and each detection box in the first image; and establishing a correspondence between the target in the second image and a target corresponding to a detection box having a maximum IoU in the first image.

19. The method for controlling a traveling object based on motion information of a target according to claim 7, wherein the determining motion information of the first target within a corresponding time range from a capturing time point of the second image to that of the first image based on the first coordinates and the third coordinates comprises:

acquiring a vector formed from the third coordinates to the first coordinates; and determining a moving direction of the first target within the time range based on a direction of the vector, and determining a moving velocity of the first target within the time range based on a norm of the vector and the time range, wherein the motion information of the first target within the time range comprises the moving direction and the moving velocity of the first target within the time range.

20. The method for controlling a traveling object based on motion information of a target according to claim 7, before the transforming second coordinates of a second target in a second camera coordinate system corresponding to the second image into third coordinates in the first camera coordinate system based on the pose change information, further comprising:

performing target detection on the second image to obtain a detection box of the second target;

acquiring depth information of the second image in the second camera coordinate system, and determining depth information of the detection box of the second target based on the depth information of the second image in the second camera coordinate system; and determining the second coordinates of the second target in the second camera coordinate system based on a location of the detection box of the second target in the image coordinate system and the depth information of the detection box of the second target.

* * * * *